United States Patent
Huang et al.

(10) Patent No.: US 9,743,435 B2
(45) Date of Patent: Aug. 22, 2017

(54) DYNAMIC ON-DEMAND DATA NETWORK CONNECTION CONTROL SERVICE

(71) Applicant: Verizon Patent and Licensing Inc., Arlington, VA (US)

(72) Inventors: Ye Huang, San Ramon, CA (US); Javier M. Lopez, Alameda, CA (US); Sergei Karpov, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 198 days.

(21) Appl. No.: 14/611,877

(22) Filed: Feb. 2, 2015

(65) Prior Publication Data

US 2016/0227590 A1    Aug. 4, 2016

(51) Int. Cl.
  *H04W 76/02* (2009.01)
  *H04W 60/00* (2009.01)
  *H04W 4/00* (2009.01)

(52) U.S. Cl.
  CPC ........... *H04W 76/02* (2013.01); *H04W 4/005* (2013.01); *H04W 60/00* (2013.01)

(58) Field of Classification Search
  CPC ............................. H04W 4/005; H04W 12/08
  USPC ................................................ 455/433, 435.1
  See application file for complete search history.

(56) References Cited

U.S. PATENT DOCUMENTS

| | | | |
|---|---|---|---|
| 2015/0117347 A1* | 4/2015 | Iwai | H04W 76/041 370/329 |
| 2015/0257115 A1* | 9/2015 | Jokimies | H04W 60/04 455/435.1 |
| 2015/0264739 A1* | 9/2015 | Hurtta | H04W 4/005 370/329 |

* cited by examiner

*Primary Examiner* — Dung Hong

(57) ABSTRACT

A method, a device, and a non-transitory storage medium provide for receiving a request from an end device to access a network; obtaining subscription data pertaining to the end device based on the request; determining whether to establish a default bearer during an attachment procedure based on at least one of the request or the subscription data; permitting attachment to the network without establishment of the default bearer based on determining not to establish the default bearer; and storing context data that indicates the end device is attached without the default bearer based on the permitting. Additionally, the method, the device, and the non-transitory storage medium provide for end device-side and network device-side setting up and tearing down of the default bearer subsequent to attachment.

20 Claims, 17 Drawing Sheets

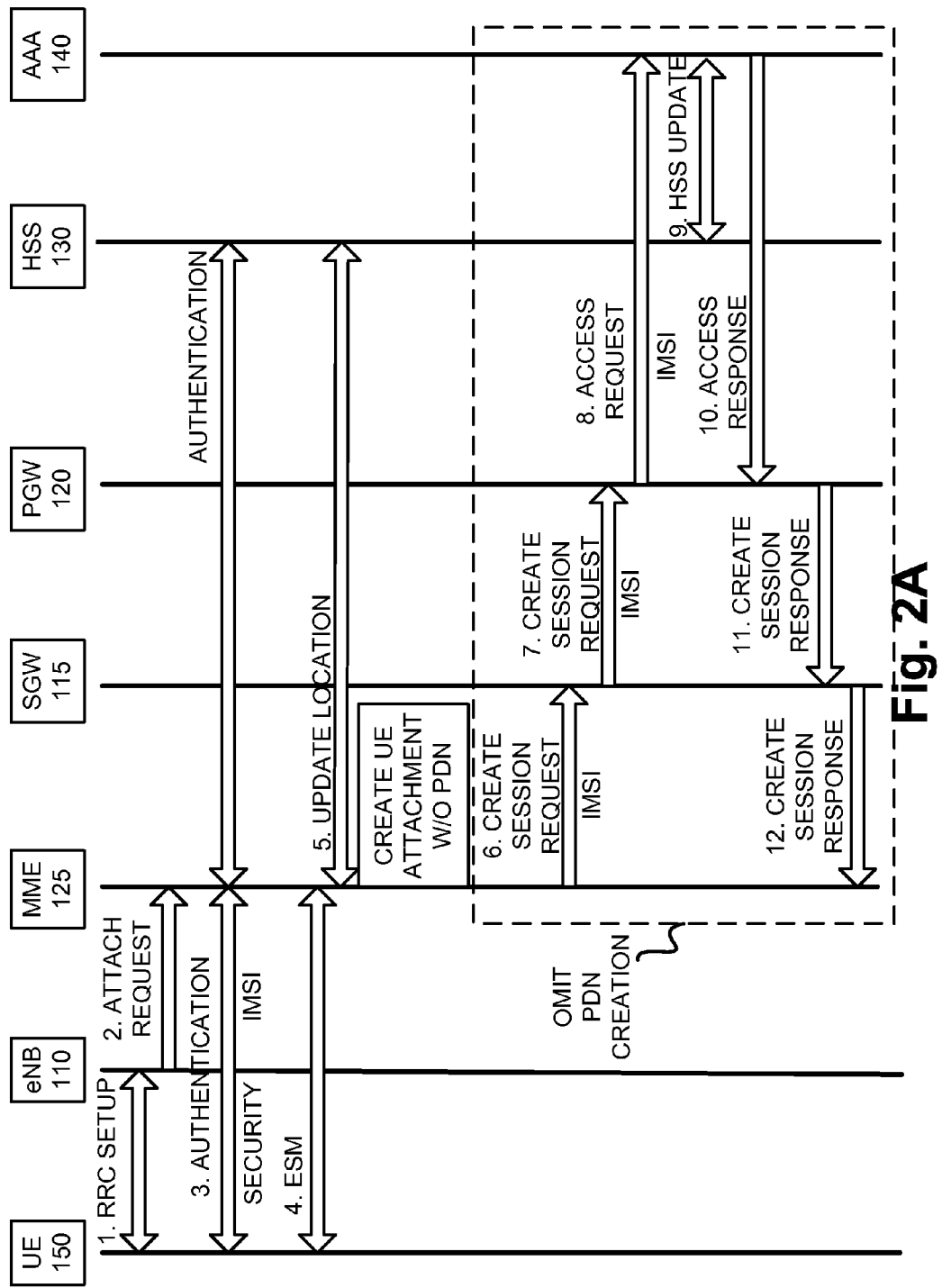

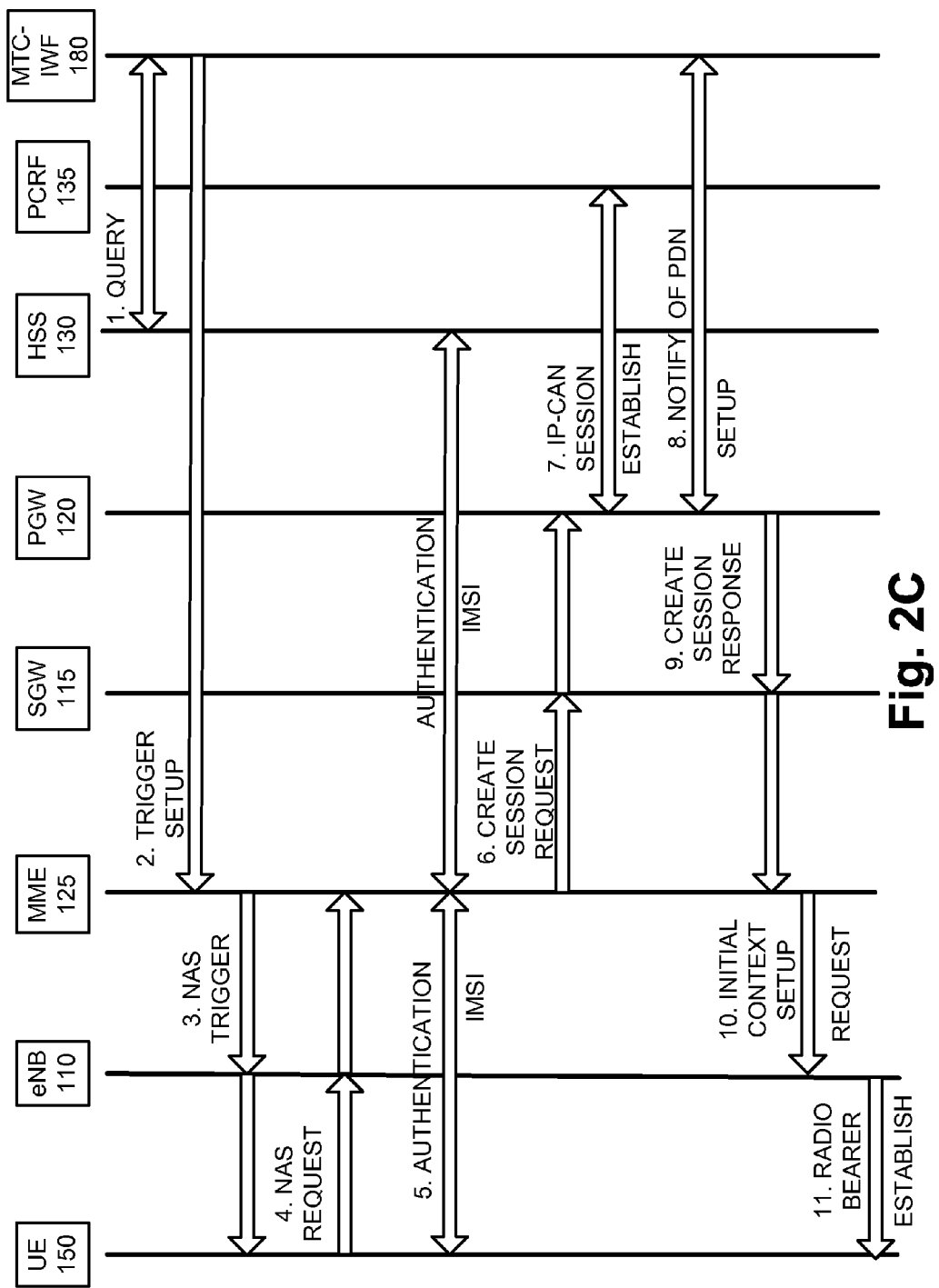

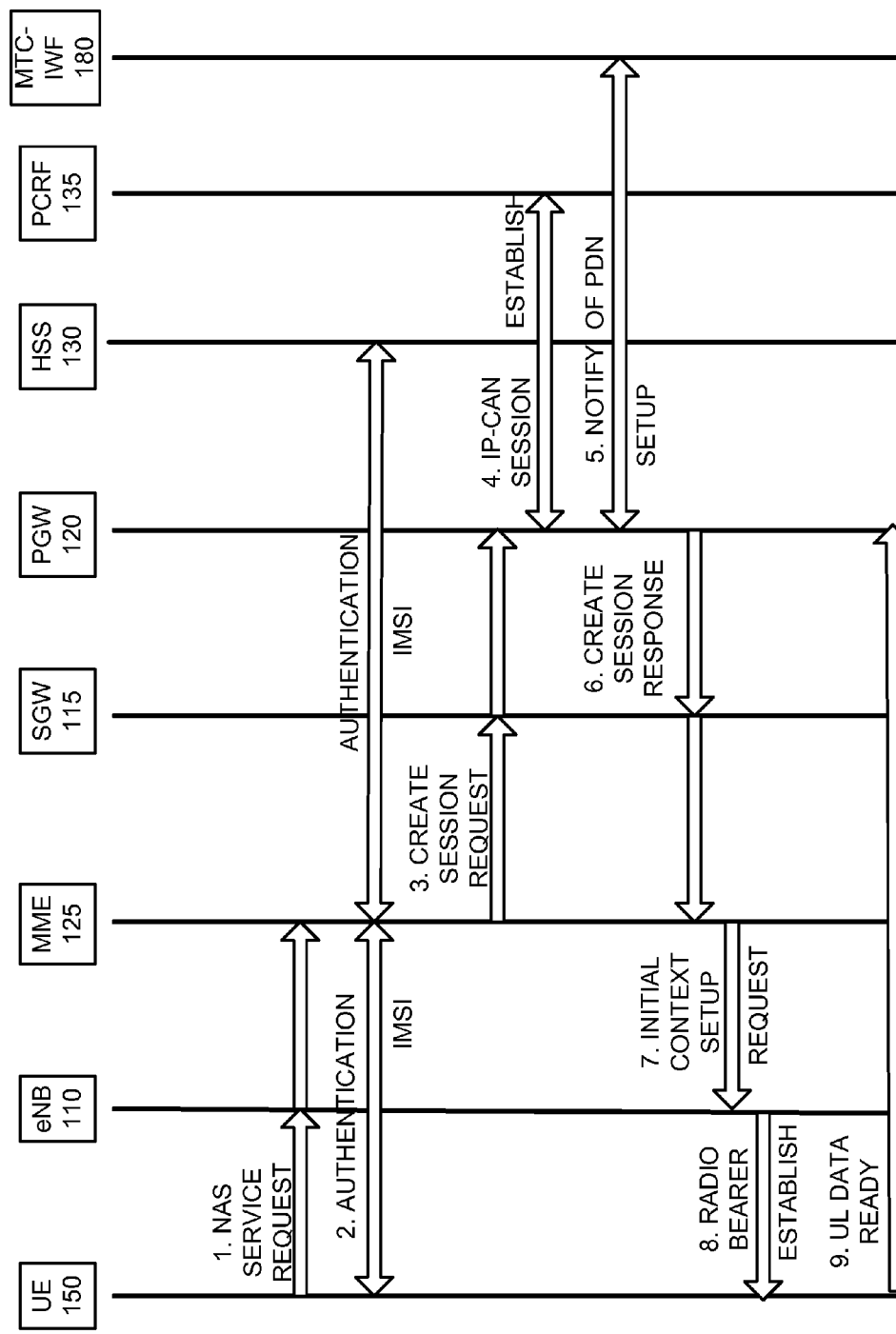

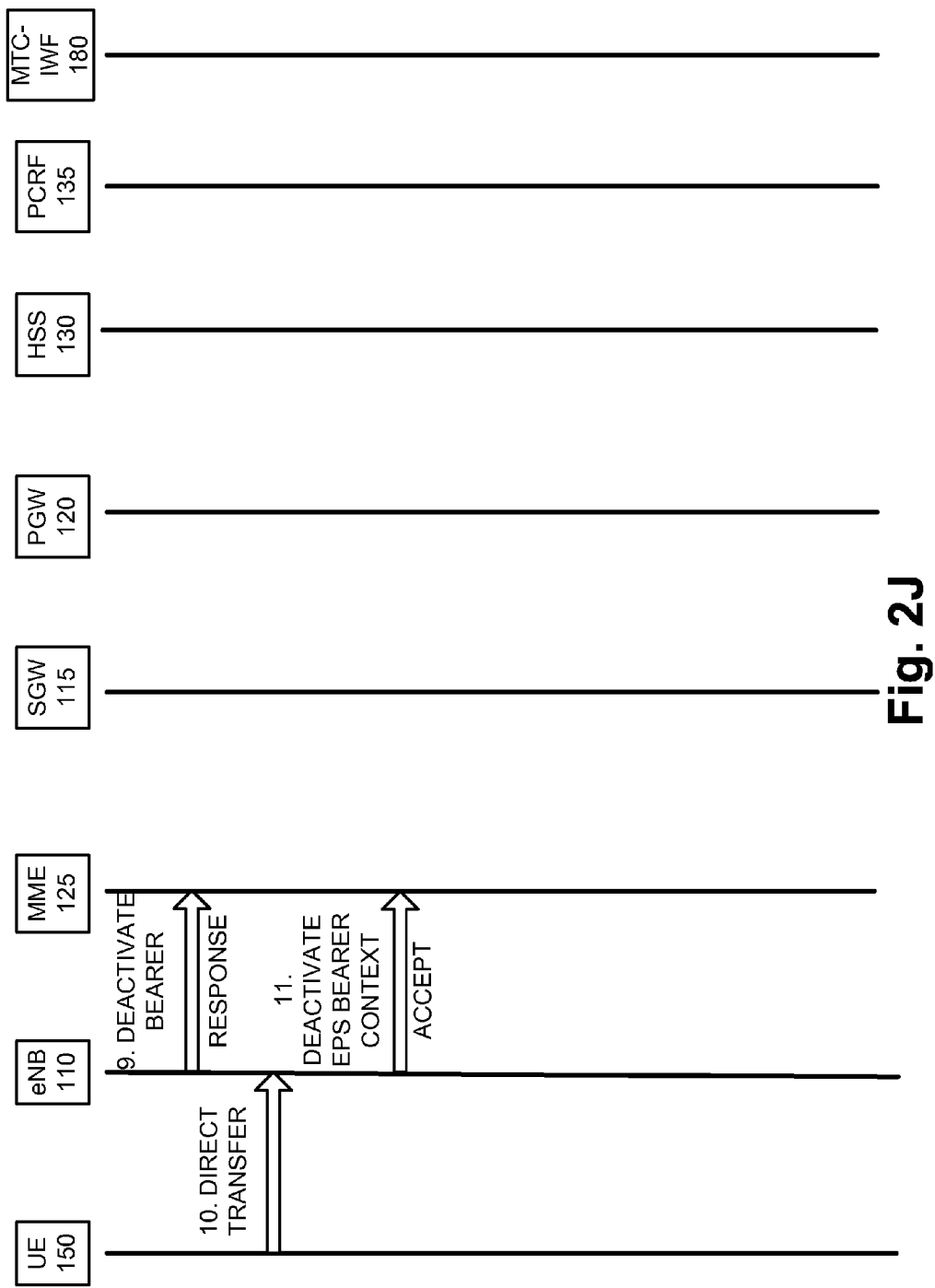

US 9,743,435 B2

DYNAMIC ON-DEMAND DATA NETWORK CONNECTION CONTROL SERVICE

BACKGROUND

Mobile devices offer various services and applications to users, such as a web service, a communication service (e.g., e-mail, short messaging service (SMS), video chat, multimedia messaging service (MMS), telephone, etc.), a media service (e.g., streaming and downloading of music, video, etc.), etc. Mobile devices may access these various services via a wireless network. For example, a mobile device may access a Long Term Evolution (LTE) network to establish a session with a network device of a packet data network (PDN). The LTE network establishes a default bearer to connect the mobile device to the network device and/or any additional bearers depending on the device service subscription profile/anchor point nodes (APNs).

BRIEF DESCRIPTION OF THE DRAWINGS

FIGS. 2A and 2B are diagrams illustrating an exemplary embodiment of the data network connection control service;

FIGS. 2C and 2D are diagrams illustrating an exemplary embodiment of a network-side invocation of the data network connection control service to set up a data connection;

FIGS. 2G and 2H are diagrams illustrating an exemplary embodiment of an end device-side invocation of the data network connection control service to set up a data connection;

FIGS. 2I and 2J are diagrams illustrating an exemplary embodiment of an end device-side invocation of the data network connection control service to tear down a data connection;

DETAILED DESCRIPTION OF PREFERRED EMBODIMENTS

Figure 1:
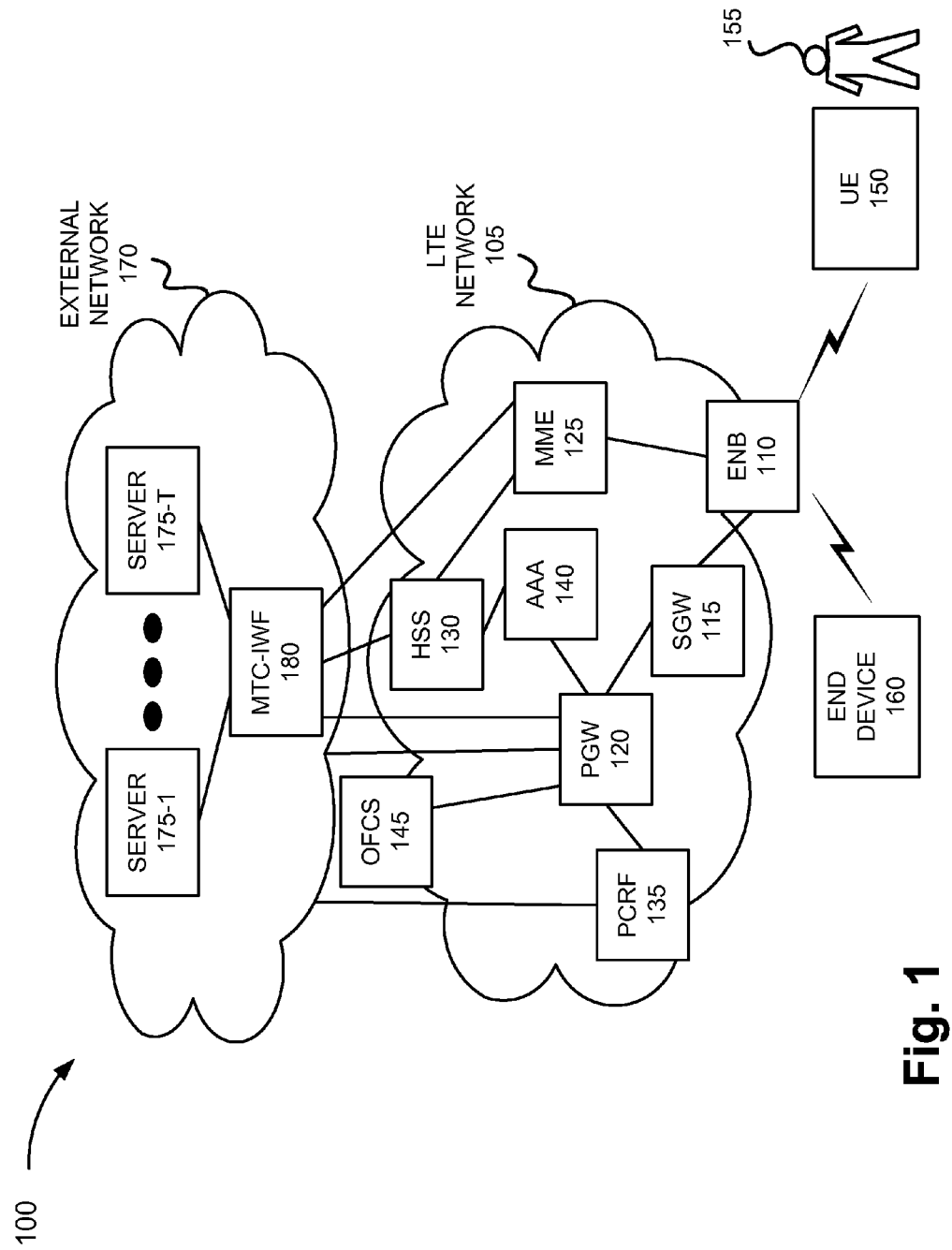
FIG. 1 is a diagram illustrating an exemplary environment in which an exemplary embodiment of a registration service may be implemented.

The following detailed description refers to the accompanying drawings. The same reference numbers in different drawings may identify the same or similar elements. Also, the following detailed description does not limit the invention.

In an LTE network, a default bearer is established to a PDN Gateway (PGW) whenever a user equipment (UE) or other type of end device attaches to the LTE network. Thus, the UE has an "always on" default bearer for each PGW to which it connects. Unfortunately, the "always on" paradigm is not necessarily needed for some business applications and machine-to-machine (M2M) applications. For example, some business, M2M, and Internet of Things (IoT) applications may infrequently transmit data. Despite this fact, network resources are always pre-allocated as part of the attachment procedure even when the end device may not have data to transmit and/or receive. As a result, network resources are unnecessarily wasted or not optimally utilized and scalability of the network is diminished.

According to an exemplary embodiment, an end device can attach to a wireless network without a creation of a default bearer (e.g., PDN) connection. According to an exemplary embodiment, a Home Subscriber Server (HSS) and a Mobility Management Entity (MME) manages an end device attachment state in which no PDN connection is created relative to the end device.

According to an exemplary embodiment, subsequent to attachment to the wireless network without the creation of the PDN connection, a PDN connection can be created dynamically, on-demand. According to an exemplary embodiment, the PDN connection can be created based on a network-side initiation. By way of example, an application server may initiate the PDN connection between the end device and the LTE network, via an intermediary device (e.g., Machine Type Communications-Interworking Function (MTC-IWF)) based on a trigger, such as a timer or other configurable event that includes to transmit or to receive data. According to another exemplary embodiment, the PDN connection can be created based on an end device initiation. For example, the end device may initiate the creation of the PDN creation based on a trigger, such as a timer or other configurable event, which includes to transmit or to receive data or tracking area update. According to an exemplary embodiment, the PDN connection may be released or torn down based on a network-side or an end device-side initiation. For example, the application server or the end device may initiate a release or a tear down of the PDN connection once a data transmission has been successfully completed. Alternatively, for example, a network-side initiated tear down of the PDN connection can be occur when the session guard time expires due to the inactivity of data transmission over the PDN connection. According to an exemplary embodiment, a PDN connection that is created stemming from an end device-side initiation or a network-side initiation may be based on certain requested parameters (e.g., Quality of Service, bandwidth, length of time needed, etc.)

FIG. 1 is a diagram illustrating an exemplary environment 100 in which an exemplary embodiment of a data network connection control service may be implemented. As illustrated, environment 100 includes an LTE network 105 that includes an evolved Node B (eNB) 110, a serving gateway (SGW) 115, a PGW 120, an MME 125, an HSS 130, and a policy charging and rules function (PCRF) 135. Additionally, environment 100 includes an authentication, authorization, and accounting (AAA) server 140, an offline charging system (OFCS) 145, a user equipment (UE) 150, a user 155, and an end device 160. Environment 100 also includes an external network 170 that includes servers 175-1 through 175-T (also referred to collectively as servers 175, and individually or generally as server 175) and a Machine Type Communications-Interworking Function (MTC-IWF) 180.

Environment 100 may be implemented to include wired, optical, and/or wireless connections among the devices and the networks illustrated. A connection may be direct or indirect and may involve an intermediary device not illustrated in FIG. 1. For example, environment 100 may include a femto device, a pico device, a home eNB, a Node B, a serving GPRS support node (SGSN), a gateway GPRS support node (GGSN), etc. Additionally, or alternatively, a connection may involve an intermediary network not illustrated in FIG. 1. For example, environment 100 may include an internetworking between LTE network 105 and another network (e.g., a 2G network, a 2.5G network, a 3G network, a 3.5G network, etc.). Additionally, the number, type (e.g., wired, wireless, etc.), and the arrangement of connections between the devices and the networks are exemplary.

A device may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device).

The number of devices, the number of networks, and the configuration in environment 100 are exemplary. According to other embodiments, environment 100 may include additional devices, fewer devices, and/or differently arranged devices, than those illustrated in FIG. 1. Additionally, or alternatively, environment 100 may include an additional network and/or differently arranged networks, than those illustrated in FIG. 1. Also, according to other embodiments, one or more functions and/or processes described as being performed by a particular device may be performed by a different device, or some combination of devices.

LTE network 105 includes a network defined by a $3^{rd}$ Generation Partnership Project (3GPP) specification or LTE architecture. ENB 110, SGW 115, PGW 120, MME 125, and PCRF 135 may each operate according to the LTE specification or architecture. Additionally, according to an exemplary embodiment, LTE network 105 provides a data network connection control service, as described herein. As previously described, according to an exemplary embodiment, the data network connection control service can be network-side initiated and user device/end device-side initiated. According to an exemplary embodiment, the data network connection control service may be initiated during initial attachment to LTE network 105 and/or subsequent to attachment to LTE network 105.

According an exemplary embodiment, MME 125 includes a function or operates in a manner that supports the data network connection control service in cooperation with other network elements of LTE network 105, as described herein. For example, MME 125 typically includes a bearer management function (or session and mobility management function) that provides management of dedicated and default bearer establishment. According to an exemplary embodiment, MME 125 does not initiate establishment of a default bearer between UE 150 or end device 160 and PGW 120 during attachment to LTE network 105. Rather, MME 125 permits attachment of UE 150 or end device 160 with LTE network 105 without a default bearer connection being established. According to an exemplary embodiment and in contrast to a conventional attachment procedure, MME 125 does not assign UE 150 or end device 160 with an IP address during the attachment procedure. According to an exemplary embodiment, MME 125 creates an attachment entry, relative to UE 150 or end device 160, in which the attachment entry indicates that no default bearer or PDN connection is created. As a consequence of omitting to establish a default bearer, messages or portions of messages exchanged, between MME 125 and other network elements of LTE network 105 (e.g., eNB 110, SGW 115, etc.), may be omitted since no default bearer or PDN connection is created. Similarly, messages or portions of messages exchanged, between UE 150 or end device 160 with network elements of LTE network 105 (e.g., SGW 115, PGW 120, etc.), may be omitted since no default bearer or PDN connection is created. UE 150 and end device 160 may enter various Non-Access Stratum (NAS) layer states (e.g., EPS Connection Management (EMS) states, EPS Mobility Management (EMM) states, EPS Connection Management (ECM) states), as well as Radio Resource Control (RRC) states in accordance with the LTE specification.

According to an exemplary embodiment, HSS 130 includes a function or operates in a manner that supports the data network connection control service in cooperation with other network elements of LTE network 105, as described herein. Typically, HSS 130 stores user subscription or user profile data. HSS 130 may also perform other services (e.g., authentication, authorization, etc.). According to an exemplary embodiment, HSS 130 stores data network connection control service data with the subscription or user profile data to indicate whether end devices (e.g., UE 150, end device 160) have subscribed to the data network connection control service. For example, the data network connection control service data may be mapped to a device identifier and/or a user identifier stored in a database managed by HSS 130. HSS 130 may also store other data. For example, the data network connection control service data may include data indicating a preference pertaining to the data network connection control service. For example, the data network connection control service may include an automated establishment and teardown of the default bearer service based on timer information. By way of further example, historical data may be collected and used to identify a periodicity in which data is transmitted and/or received. Based on the historical data, an automated setup and teardown of the default bearer could be initiated by, for example, MME 125 and/or other suitable LTE network element. In this way, for example, UE 150, end device 160, server 175, and/or MTC-IWF 180 may not have to request for the setting up and/or the tearing down of a default bearer, subsequent to the attachment of UE 150 or end device 160. Additionally, for example, the data network connection control service data may include data indicating a preference that, as a default, the data network connection control service is to be invoked when the end device attaches to the LTE network.

AAA 140 includes a device that provides authentication, authorization, and accounting services. AAA 140 may store data pertaining to the data network connection control service. For example, AAA 140 may store that a device and/or a user is subscribed to the data network connection control service, preference data pertaining to this service, if the PDN session is active, how long the PDN connection has been active, etc.

OFCS 145 includes a device that provides an off-line charging service that includes the generation of charging data records (CDRs) for the billing system.

UE 150 may include a mobile device. For example, UE 150 may be implemented as a smartphone, a personal digital assistant, a tablet, a netbook, an infotainment system in a vehicle, or a wearable device (e.g., a watch, glasses, etc.). Alternatively, UE 150 may be implemented as a non-mobile or stationary device, such as a kiosk, a point of sale terminal, a vending machine, a set top box, etc.

End device 160 may include a mobile device or a non-mobile device. For example, end device 160 may be implemented as a meter device associated with providing a utility service (e.g., gas, electric, etc.), a smart device (e.g., a sensor device, a home security system, a healthcare device, etc.). In this regard, end device 160 may operate to provide machine-to-machine (M2M) communication with or without an end user. The term "machine-to-machine" or "M2M" communication, as used herein, is intended to be broadly interpreted to include communication between two or more devices. Additionally, it is intended that other terms and their meanings, such as, for example, device-to-device (D2D) communication, an IoT communication, and/or telemetry are incorporated into the term machine-to-machine communication. However, given the expansive nature of M2M communications, this description does not intend to set forth an exhaustive treatment of the various types of end devices 160 that may be implemented. The term "machine-to-machine" or "M2M" software, application, or service, is intended to be broadly interpreted to include software, an application, or a service pertaining to M2M communications. For example, M2M software may include software pertaining to utility metering, security, healthcare, transportation, sensor-related, smart devices, telematics, retail, smart energy, logistics, etc.

External network 170 includes one or multiple networks of one or multiple types. For example, external network 170 may be implemented as a service or application-layer network, the Internet, an Internet Protocol Multimedia Subsystem (IMS) network, a proprietary network, a cloud network, a data network, etc. Server 175 includes a network device that provides an application or a service. For example, server 175 may be implemented to provide an M2M application or service. MTC-IWF 180 includes a network device that acts as an intermediary device between a wireless network (e.g., LTE network 105) and M2M application/services (e.g., servers 175).

Figure 2B:
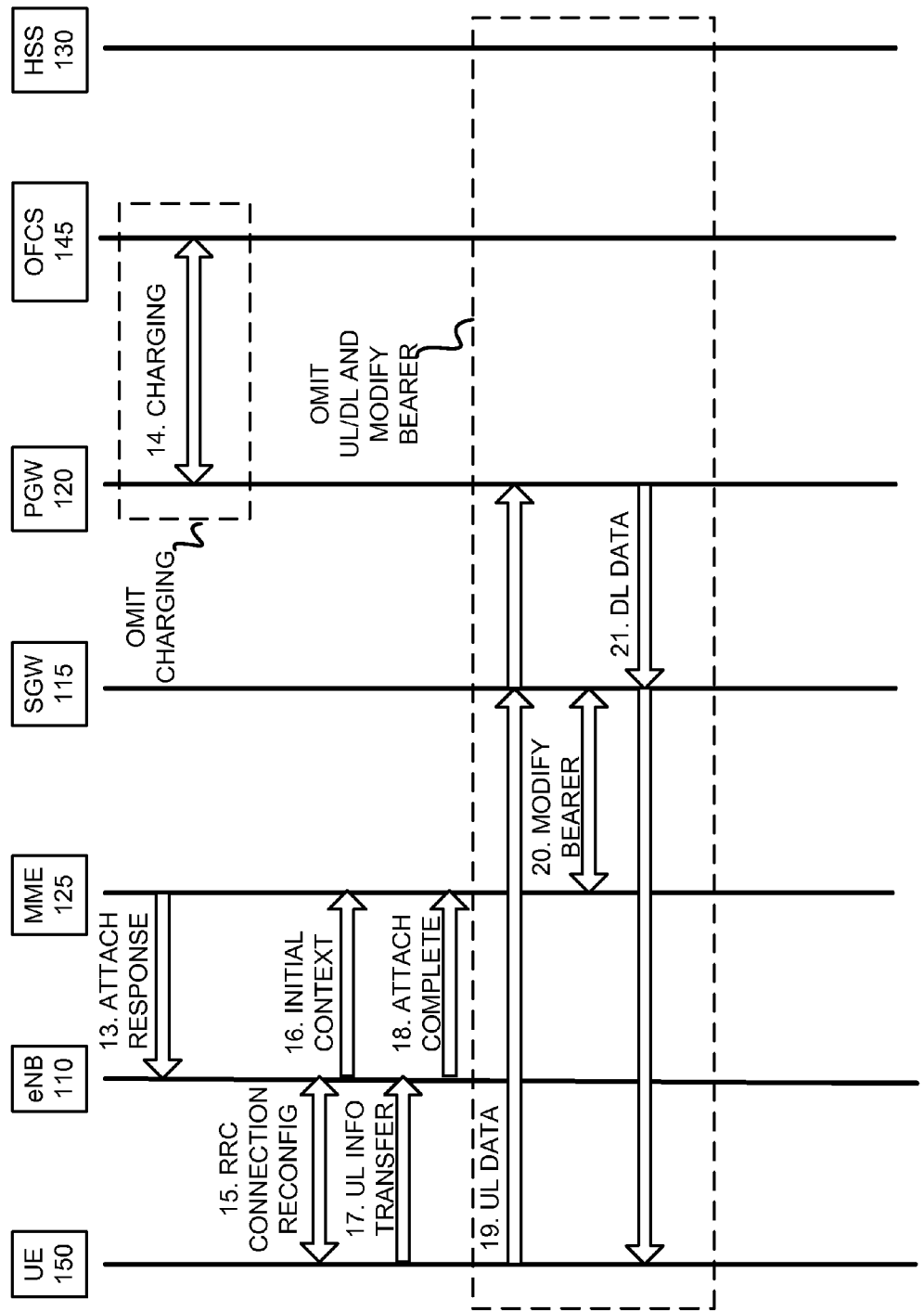

FIGS. 2A and 2B are diagrams illustrating an exemplary embodiment of the data network connection control service implemented as a part of an attachment procedure. Although FIGS. 2A and 2B illustrate UE 150, according to other embodiments, UE 150 may be substituted with end device 160. Additionally, the messages explained and illustrated are exemplary and do not represent each and every message that may be exchanged during the attachment procedure. For example, a random access procedure, which is not illustrated in FIG. 2A, may take place before a radio resource control (RRC) connection establishment procedure. Referring to FIG. 2A, UE 150 and eNB 110 exchange messages to establish an RRC connection, as illustrated by message one (1) (RRC setup). For example, UE 150 transmits an RRC Connection Request to eNB 110, eNB 110 transmits, in response, an RRC Connection Setup, and UE 150 transmits, in reply, an RRC Connection Setup Complete, which also includes a non-access stratum (NAS) attach request. As illustrated, eNB 110 transmits an Attach Request, as illustrated by message two (2) (Attach Request), to MME 215. However, in contrast to a conventional Attach Request, according to an exemplary embodiment, the Attach Request does not include a PDN Connectivity Request. According to an exemplary implementation, eNB 110 identifies an invocation of the data network connection control service (e.g., so that a PDN connection is not created) based on data (e.g., a flag) carried in the RRC Connection Request, the RRC Connection Setup Complete, or in an acknowledgement message. For example, a bit of data may indicate to invoke the data network connection control service when the bit has a value of one (1) and not to invoke the data network connection control service when the bit has a value of zero (0). In this way, UE 150 may invoke or not invoke the data network connection control service during attachment to a wireless network (e.g., LTE network 105). According to another exemplary embodiment, eNB 110 transmits the Attach Request that includes the PDN Connectivity Request. In either case, as explained further below, whether the Attach Request includes the PDN Connectivity Request or not, according to an exemplary embodiment, MME 215 determines when to invoke the data connection control service and/or establish or not establish a PDN connection.

After an RRC connection is established, an authentication procedure begins. For example, UE 150 transmits authentication and security-related messages to MME 125, as illustrated by message three (3) (Authentication/Security). The authentication/security messaging may include an International Mobile Subscription Identity (IMSI) or other identifier. In turn, MME 125 and HSS 130 exchange messages, as further illustrated by message three (3). For example, MME 125 transmits an Authentication Information Request to HSS 130 that includes the IMSI. In response, HSS 130 transmits an Authentication Information Answer to MME 125. As illustrated in message four (4) (Evolved Packet System Session Management (ESM)), MME 125 and UE 150 exchange messages (e.g., ESM Information Request/Response) for ESM information. Thereafter, MME 125 and HSS 130 exchange message, illustrated in message five (5) (Update Location). For example, MME 125 transmits an Update Location Request. According to an exemplary embodiment, in response to receiving the Update Location Request, HSS 130 accesses stored subscription data pertaining to UE 150. For example, the subscription data includes data network connection control service data, which indicates that UE 150 is subscribed to the data network connection control service. Additionally, according to this example, assume that the data network connection control service data indicates, as a default or preference, that the data network connection control service is to be invoked during attachment. For example, certain UEs 150 may, as a default, always invoke the data network connection control service in which during attachment, a default bearer is not established. HSS 130 generates and transmits an Update Location Request Answer. According to an exemplary embodiment, the Update Location Request Answer carries subscription data (e.g., PDN subscription context and/or data network connection control service data). For example, the data network connection control service data may include one or more bits of data (e.g., flag(s)) that indicate UE 150 is subscribed to the data network connection control service and/or a preference (e.g., a default parameter, etc.). By way of example, the preference may indicate a maximum PDN session timer (e.g., X number of minutes) in which a default bearer is maintained before a tear down.

Referring to FIG. 2A, in response to receiving the Update Location Request Answer, according to an exemplary embodiment, MME 125 determines whether to establish a PDN connection. According to an exemplary implementation, MME 125 determines not to establish the PDN connection based on the absence of the PDN Connectivity Request in the Attach Request and/or the data network connection control service data included in the Update Location Request Answer. Alternatively, according to another exemplary implementation, MME 125 determines not to establish the PDN connection, despite the fact that the PDN Connectivity Request is included in the Attach Request, based on the data network connection control service data included in the Update Location Request Answer. As a result of such a determination, MME 125 constructs a context for UE 150 that includes attachment without a PDN connection. Additionally, MME 125 does not assign an IP address to UE 150. Since MME 125 does not establish a PDN connection, then the exemplary messaging illustrated thereafter in FIG. 2A is not performed. For example, MME 125 does not transmit a General Packet Radio Service Tunneling Protocol (GTP) Create Session Request to SGW 115, as illustrated by message six (6) (Create Session Request); SGW 115 does not transmit a Create Session Request to PGW 120 (e.g., a Create Default Bearer Request), as illustrated by message seven (7); access messages (e.g., Access-Request (AAR) and Access-Accept (AAA) are not transmitted between PGW 120 and AAA 140, as illustrated by message eight (8) (Access Request) and message ten (10) (Access Response); AAA 140 and HSS 130 do not transmit update messages, as illustrated by message nine (9) (HSS Update); PGW 120 does not transmit a Create Session Response to SGW 115 (e.g., a Create Default Bearer Request), as illustrated by message eleven (11) (Creation Session Response); and SGW 115 does not transmit a Create Session Response (e.g., a Create Default Bearer Request), as illustrated by message twelve (12) (Create Session Response). Other messages, not illustrated in FIG. 2A, may also be omitted, such as messages exchanged between PGW 120 and PCRF 135 (e.g., IP-CAN Session Establishment, IP-CAN Control Session Establishment Procedure), and messages exchanged between PCRF 135 and HSS 130 (e.g., User Data Request/Answer, and Subscribe Notification Request/Answer).

Referring to FIG. 2B, MME 125 transmits an Attach Response, as illustrated by message thirteen (13). For example, the Attach Response includes two messages, an S1AP Initial Context Setup Request and an NAS Attach Accept. However, the Attach Response may not include an Activate Default Bearer Request since no PDN connection has been established. Additionally, PGW 120 and OFCS 145 do not exchange messages (e.g., an Accounting Request (ACR-Start) and an Accounting Answer (ACA), as illustrated by message fourteen (14) (Charging). As further illustrated, UE 150 and eNB 110 transmit messages (e.g., an RRC Connection Reconfiguration (Attach Accept) and an RRC Connection Reconfiguration Complete), as illustrated by message fifteen (15) (RRC Connection). According to an exemplary implementation, the RRC Connection Reconfiguration message, sent from eNB 110 to UE 150, may or may not indicate to activate the default bearer, since no PDN connection has been established. According to an example, when the RRC Connection Reconfiguration message indicates to activate the default bearer, UE 150 may ignore such an indication.

As further illustrated, eNB 110 transmits a message (e.g., an Initial Context Setup Response) to MME 125, illustrated as message sixteen (16) (Initial Context). Additionally, UE 150 transmits uplink information (e.g., a Direct Transfer (Attach Complete) message) to eNB 110, illustrated as message seventeen (17), and eNB transmits an Attach Complete to MME 125, illustrated as message eighteen (18). Since the PDN connection is not established, the remaining messages illustrated in FIG. 2B, as indicated, may be omitted. For example, message nineteen (19) (Uplink (UL) Data), message twenty (20) (Modify Bearer), and message twenty-one (Downlink (DL) Data) may not be transmitted and received by the UE 150 and respective network elements of LTE network 105, as illustrated.

While FIGS. 2A and 2B illustrate exemplary messaging and describe exemplary processes that provide the data network connection control service, according to other embodiments, UE 150 and/or network elements of LTE network 105 (e.g., MME 125, etc.) may perform additional, different, and/or fewer processes to provide for the attachment of UE 150 to LTE network 105 without a default bearer being established. For example, messages different from those explained above, may carry data pertaining to the data network connection control service, and consequently used to determine whether to establish a PDN connection. Alternatively, new or modified messages and/or new or modified interfaces associated with the network elements may be implemented to accomplish the same task as described.

Figure 2D:
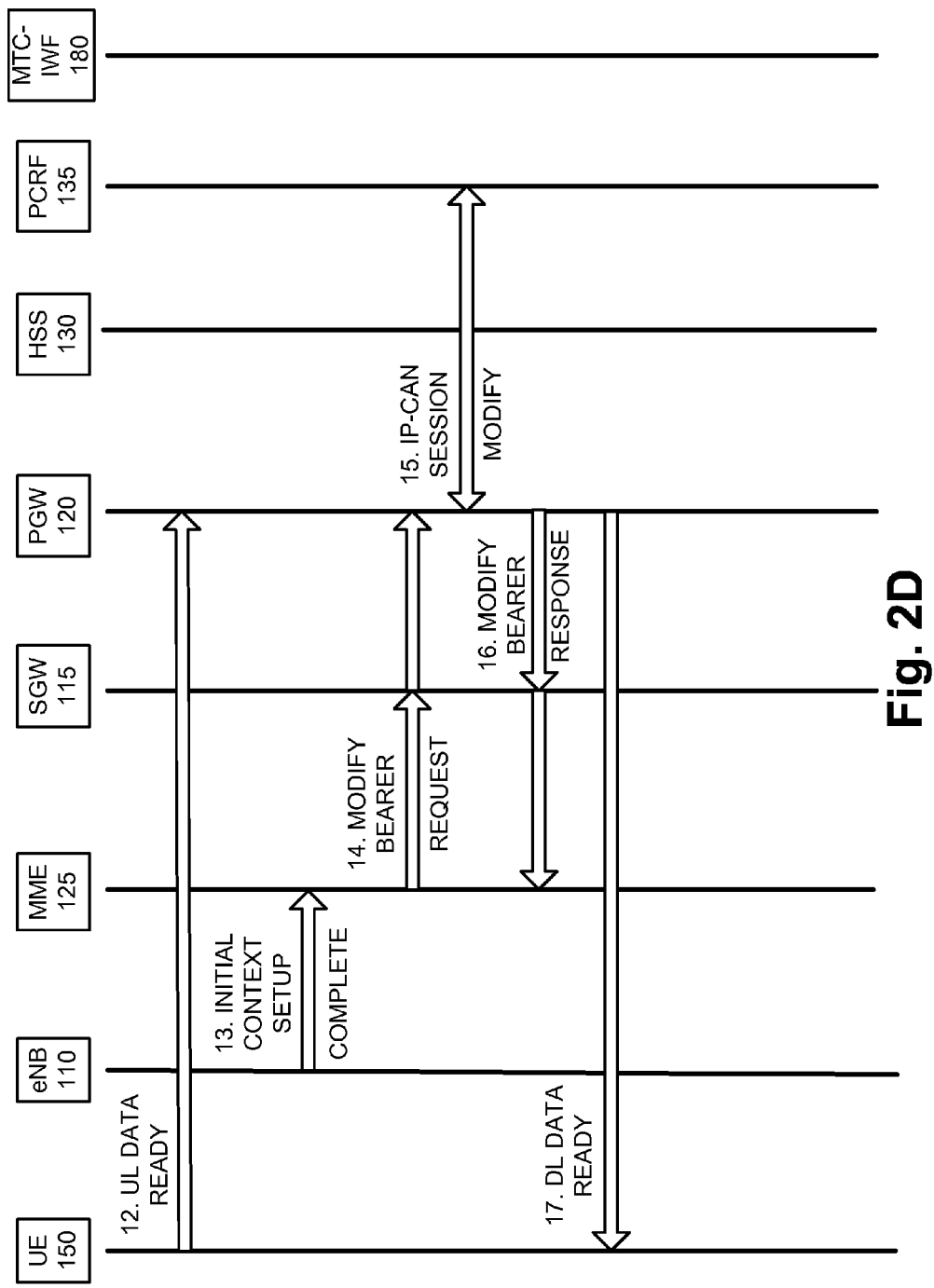

FIGS. 2C and 2D are diagrams illustrating an exemplary embodiment of a network-side invocation of the data network connection control service to set up a data connection. Although FIGS. 2C and 2D illustrate UE 150, according to other embodiments, UE 150 may be substituted with end device 160. Also assume that the network-side invocation is the first or initial invocation in which certain information pertaining to UE 150 is not known or stored by server 175 and/or MTC-IWF 180. According to an exemplary scenario, assume that subsequent to attachment to LTE network 105, server 175 initiates an invocation of the data network connection control service, via MTC-IWF 180, to cause UE 150 to set up a PDN connection. For example, although not illustrated, server 175 transmits a trigger message to MTC-IWF 180. The trigger message may include a request to communicate with UE 150 and an external device ID (e.g., a Uniform Resource Identifier (URI)) of UE 150. The trigger message may also include a trigger identifier (e.g., a referent to the request).

Referring to FIG. 2C, in response to receiving the trigger message from server 175, MTC-IWF 180 and HSS 130 perform a Query procedure, illustrated as message one (1) (Query). For example, MTC-IWF 180 transmits a message (e.g., a Subscriber Information Request) to HSS 130. For example, MTC-IWF 180 queries HSS 130 to obtain an identifier of UE 150 (e.g., IMSI, etc.) and a network address of the serving MME (e.g., MME 125) of UE 150. MTC-IWF 180 may also query HSS 130 whether UE 150 subscribes to the data network connection control service, and if so, the connection state or context of UE 150 (e.g., attached, without PDN connection, attached with PDN connection, etc.). Assume HSS 130 stores this type of information, which may be mapped to the external device ID. HSS 130 transmits a message (e.g., a Subscriber Information Response) to MTC-IWF 180 that includes the information queried, such as, the IMSI of UE 150, the network address of MME 125, an indication that UE 150 subscribes to the data network connection control service, and that UE 150 is attached without a PDN connection.

In response to receiving the message from HSS 130, MTC-IWF 180 transmits a trigger message (e.g., a Device Trigger Message, a Paging message) to MME 125, as illustrated by message two (2) (Trigger Setup). For example, the trigger message includes a request for UE 150 to establish a PDN connection (e.g., a default bearer with PGW 120) and the IMSI of UE 150. The trigger message may also include the trigger identifier (e.g., the referent to the device trigger request). Additionally, the trigger message may include parameters pertaining to the default bearer that is to be created. For example, the parameters may indicate a particular level of QoS (e.g., low, medium, high, etc.), bandwidth and/or bit rate, length of time (min., max.), allocation and retention priority (ARP), etc. MME 125 receives the trigger message, and in response, transmits a message (e.g., a Paging message) to eNB 110, illustrated as message three (3) (NAS Trigger). The Paging message includes a request for UE 150 to establish a PDN connection to LTE network 105. In response to receiving the Paging message, eNB 110 transmits a message (e.g., a Paging message) to UE 150, also illustrated as message three (3) (NAS Trigger).

UE 150 receives the message from eNB 110, and in response, transmits a message (e.g., a Service Request-Initiated) to MME 125 via eNB 110, illustrated as message four (4) (NAS Service Request). The message indicates to establish a default bearer between UE 150 and PGW 120. MME 125 assigns an IP address to UE 150. Thereafter, the messaging, as illustrated in messages five (5) through (17) of FIGS. 2C and 2D, may proceed as conventionally performed to establish a PDN connection during an attachment procedure. However, as illustrated by message eight (8) (Notify of PDN Setup), PGW 120 and MTC-IWF 180 communicate. For example, PGW 120 transmits a message to MTC-IWF 180 to inform MTC-IWF 180 that a PDN connection is being established. The message may also include the referent. Subsequent to establishment of the default bearer, server 175 and/or UE 150 may transmit/receive data to each other.

While FIGS. 2C and 2D illustrate exemplary messaging and describe exemplary processes that provide the data network connection control service, according to other embodiments, UE 150 and/or network elements of LTE network 105 (e.g., MME 125, etc.) may perform additional, different, and/or fewer processes to provide for the establishment of a PDN connection (e.g., a default bearer). For example, messages different from those explained above, may carry data pertaining to the data network connection control service, and consequently used to initiate the establishment of the default bearer. Alternatively, new or modified messages and/or new or modified interfaces associated with the network elements may be implemented to accomplish the same task as described.

Figure 2E:
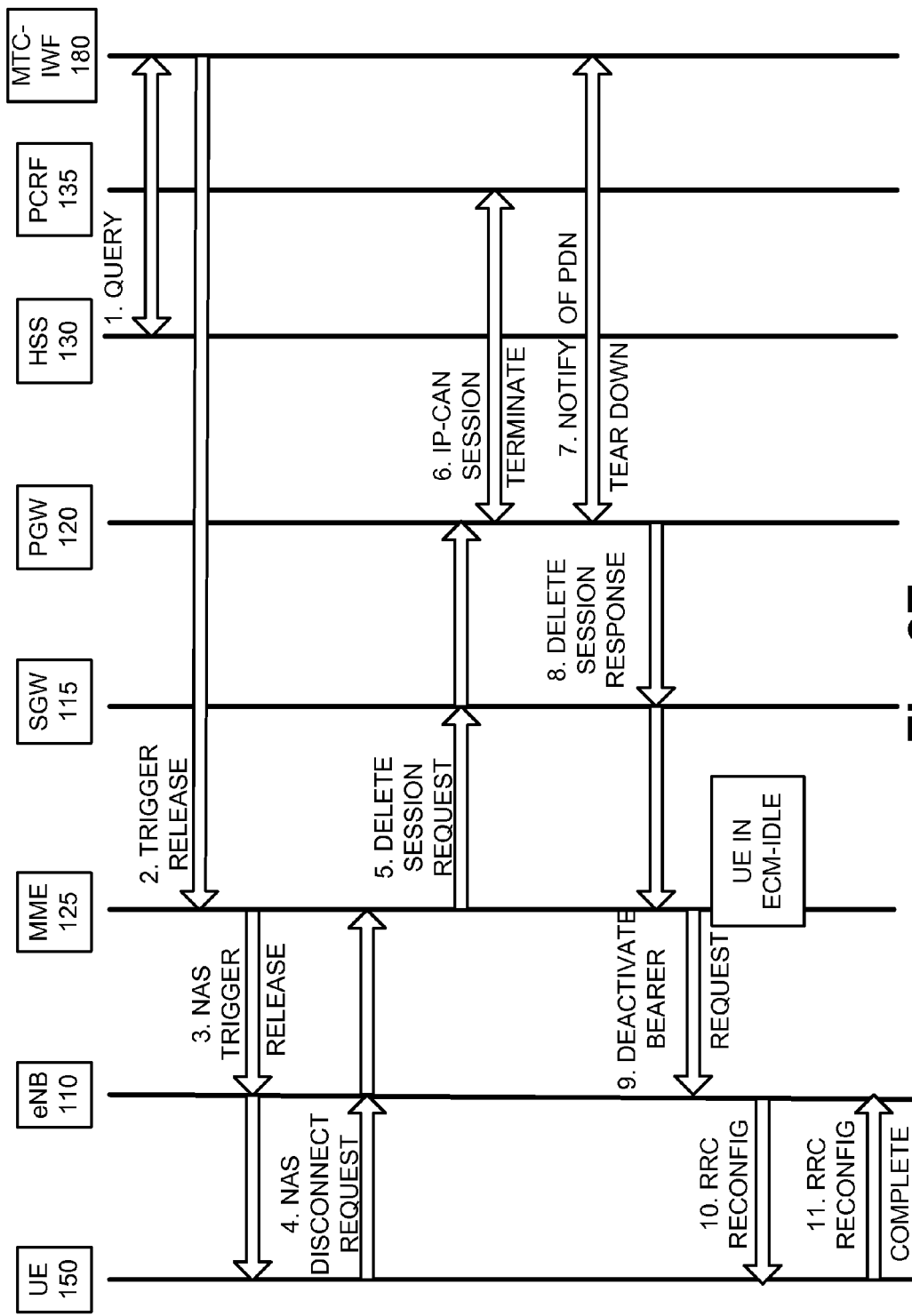
FIGS. 2E and 2F are diagrams illustrating an exemplary embodiment of a network-side invocation of the data network connection control service to tear down a data connection.
Figure 2F:
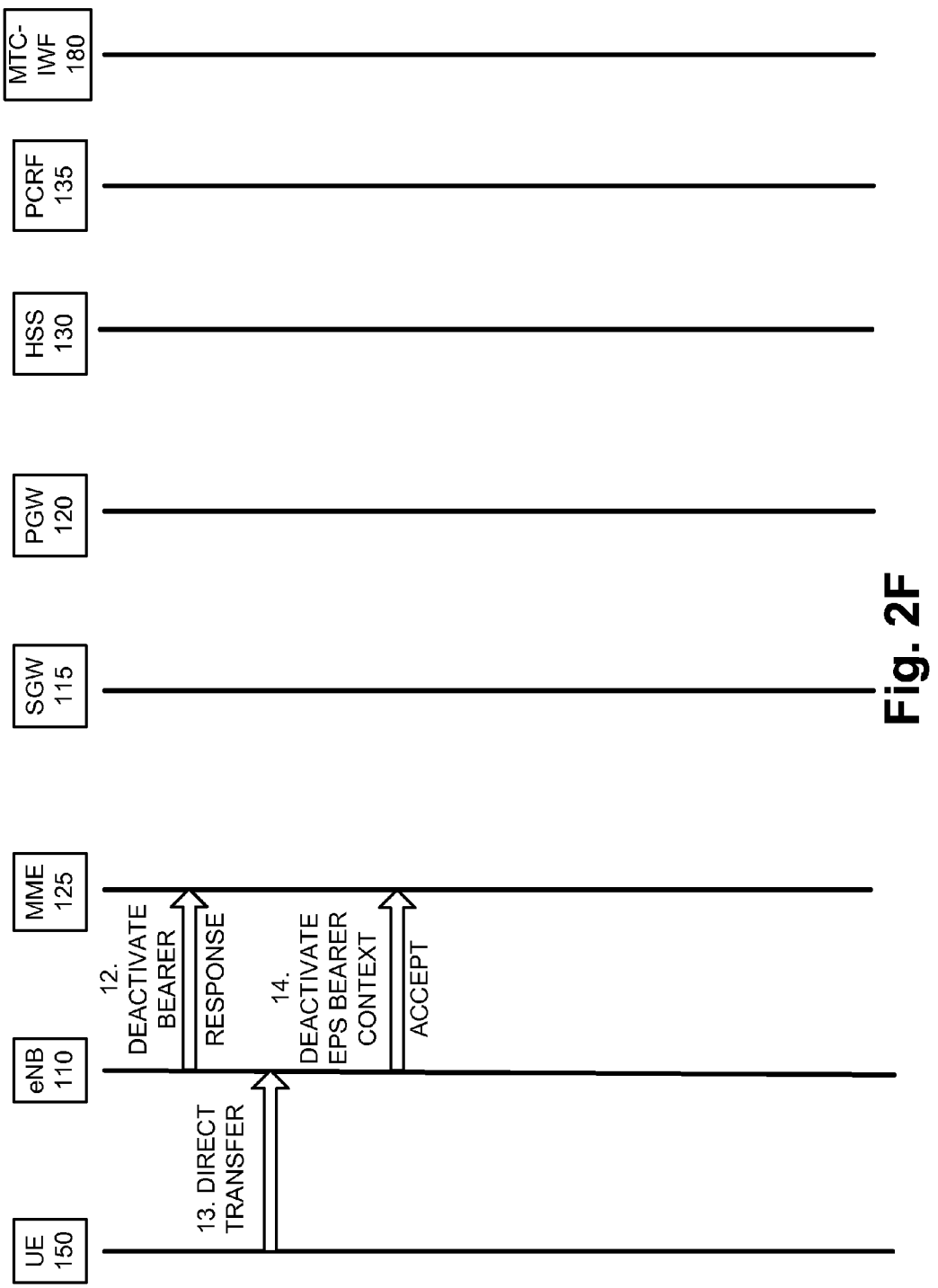

FIGS. 2E and 2F are diagrams illustrating an exemplary embodiment of a network-side invocation of the data network connection control service to tear down a data connection. Although FIGS. 2E and 2F illustrate UE 150, according to other embodiments, UE 150 may be substituted with end device 160. According to an exemplary scenario, assume that subsequent to a default bearer being established between UE 150 and PGW 120, server 175 initiates an invocation of the data network connection control service, via MTC-IWF 180, to cause UE 150 to tear down a PDN connection. For example, although not illustrated, server 175 transmits a trigger message to MTC-IWF 180. The trigger message may include a request to tear down the default bearer and, an external device ID (e.g., a Uniform Resource Identifier (URI)) of UE 150 and/or the IMSI of UE 150. The trigger message may also include a trigger identifier (e.g., a referent to the request to tear down the default bearer).

Referring to FIG. 2E, in response to receiving the trigger message from server 175, MTC-IWF 180 and HSS 130 perform a Query procedure, illustrated as message one (1) (Query). According to another exemplary embodiment, process 600 may omit this step. For example, when server 175 and/or MTC-IWF 180 stores information pertaining to the setting up of the default bearer (e.g., IMSI of UE 150, network addresses of UE 150, MME 125, etc.) and UE 150 is a not a mobile device, MTC-IWF 180 may transmit a trigger message to MME 125 without querying HSS 130. According to an exemplary embodiment, MTC-IWF 180 and/or server 175 stores information pertaining to the invocation of the data network connection control service (e.g., a set up of a default bearer pertaining to UE 150 and/or a tear down of another default bearer pertaining to UE 150), regardless of whether the default bearer that requires teardown, is initially set up based on a network-side initiation (e.g., via MTC-IWF 180) or a UE 150/end device 160-side initiation. For example, MTC-IWF 180 and/or server 175 obtains and stores information based on a previous query of HSS 130 and/or information carried in a notification from PGW 120 that a default bearer is established (e.g., FIG. 2C, message eight (8)). However, even when MTC-IWF 180 and/or server 175 stores information pertaining to the set up and/or tear down of a default bearer, the Query procedure may still be performed, as described further below.

As an example of the Query procedure, MTC-IWF 180 transmits a message (e.g., a Subscriber Information Request) to HSS 130. According to an exemplary embodiment, MTC-IWF 180 selects what information to query HSS 130. For example, when MTC-IWF 180 stores information and/or when server 175 stores information and the trigger message from server 175 to MTC-IWF 180 carries information, MTC-IWF 180 selects what information is needed from HSS 130, if any. As an example, according to a use case in which UE 150 is a mobile device, MTC-IWF 180 queries HSS 130 for certain types of information including the network address of the serving MME. According to another exemplary use case, when UE 150 is not a mobile device, MTC-IWF 180 previously queried HSS 130 in relation to the setting up of the default bearer, and/or MTC-IWF 180 and/or server 175 stores information pertaining to the setting up of the default bearer (e.g., IMSI of UE 150, network addresses of UE 150, MME 125, etc.), MTC-IWF 180 may not query HSS 130 for the network address of the serving MME (e.g., MME 125). Additionally, MTC-IWF 180 may not query HSS 130 for other information, such as the IMSI of UE 150 and subscription data pertaining to the data network connection control service (e.g., preferences, etc.). However, for example, MTC-IWF 180 may still query HSS 130 for the current connection state or context of UE 150, regardless of whether UE 150 is a mobile device or a non-mobile device. Referring back to the example of the Query procedure, in response to receiving the Subscriber Information Request, HSS 130 transmits a message (e.g., a Subscriber Information Response) to MTC-IWF 180 that includes the information queried.

In response to receiving the message from HSS 130, MTC-IWF 180 transmits a trigger message (e.g., a Device Trigger Message, a Short Messaging Service (SMS) message) to MME 125, as illustrated by message two (2) (Trigger Release). For example, the trigger message includes a request for UE 150 to initiate a teardown of a default bearer with PGW 120 and the IMSI of UE 150. The trigger message may also include the trigger identifier (e.g., the referent to the device trigger request). MME 125 receives the trigger message, and in response, transmits a message (e.g., an SMS message) to eNB 110, illustrated as message three (3) (NAS Trigger Release). The SMS message includes a request for UE 150 to initiate a teardown of the default bearer to LTE network 105. In response to receiving the SMS message, eNB 110 transmits a message (e.g., an SMS message) to UE 150, also illustrated as message three (3) (NAS Trigger Release). According to an exemplary implementation, in the case of an abnormal release of an established PDN connection, the release request may include a "cause code" that indicates a cause and provides for customizable device behavior between server 175 and UE 150/end device 160.

UE 150 receives the message from eNB 110, and in response, transmits a message (e.g., a PDN Disconnection Request) to MME 125 via eNB 110, illustrated as message four (4) (NAS Disconnect Request). The message indicates to release all EPS bearer contexts established toward this PDN connection, including the default bearer context. Additionally, in the message, UE 150 may set the value of Linked EPS Bearer Identity as the EPS Bearer Identify of the default bearer pertaining to the trigger identifier (e.g., the referent). Thereafter, as illustrated in FIG. 2E, MME 125 initiates a teardown by transmitting a message to SGW 115, illustrated as message five (5) (Delete Session Request), which may include a Tunnel Endpoint Identifier (TEID). SGW 115 transmits the message (e.g., a Delete Session Request) to PGW 120. In response, PGW 120 invokes an IP-CAN Session Termination procedure to indicate that resources have been released. For example, PGW 120 transmits a message (e.g., an IP-CAN Session Termination) to PCRF 135, illustrated as message six (6) (IP-CAN Session Terminate). Additionally, PGW 120 transmits a notification to MTC-IWF 180 that indicates that the PDN connection is released, illustrated as message seven (7) (Notify of PDN Tear Down). Additionally, the notification may include the IMSI of UE 150, the device trigger (e.g., the referent pertaining to message two (2)), etc. PGW 120 also transmits a message to SGW 115, which propagates to MME 125, illustrated as message eight (8) (Delete Session Response).

As further illustrated in FIG. 2E, MME 125 transmits a message to eNB 110, illustrated as message nine (9) (Deactivate Bearer Request), and MME 125 changes the ECM-context of UE 150 to an ECM IDLE state. In response to receiving message (9), eNB 110 invokes an RRC Connection procedure, in which messages ten (10) and eleven (11) are exchanged between eNB 110 and UE 150, illustrated as message ten (10) (RRC Reconfig) and message eleven (11) (RRC Reconfig Complete). Referring to FIG. 2F, the deactivation of the bearer is completed based on messages twelve (12) (Deactivate Bearer Response), thirteen (13) (Direct Transfer), and fourteen (14) (Deactivate EPS Bearer Context Accept).

While FIGS. 2E and 2F illustrate exemplary messaging and describe exemplary processes that provide the data network connection control service, according to other embodiments, UE 150 and/or network elements of LTE network 105 (e.g., MME 125, etc.) may perform additional, different, and/or fewer processes to provide for the tearing down of a PDN connection (e.g., a default bearer). For example, messages different from those explained above, may carry data pertaining to the data network connection control service, and consequently used to initiate the teardown of the default bearer. Alternatively, new or modified messages and/or new or modified interfaces associated with the network elements may be implemented to accomplish the same task as described.

Figure 2H:
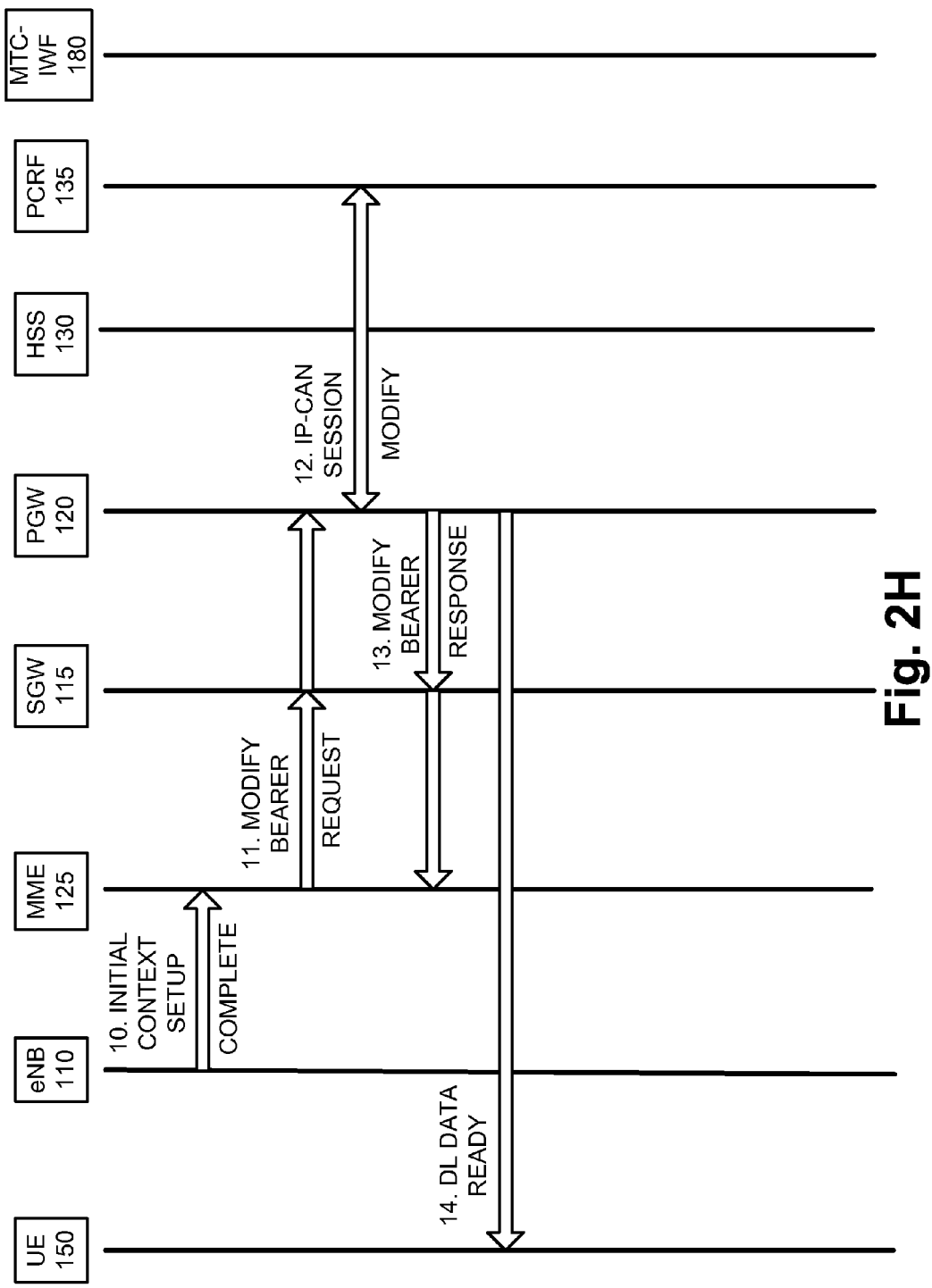
Figure 21:
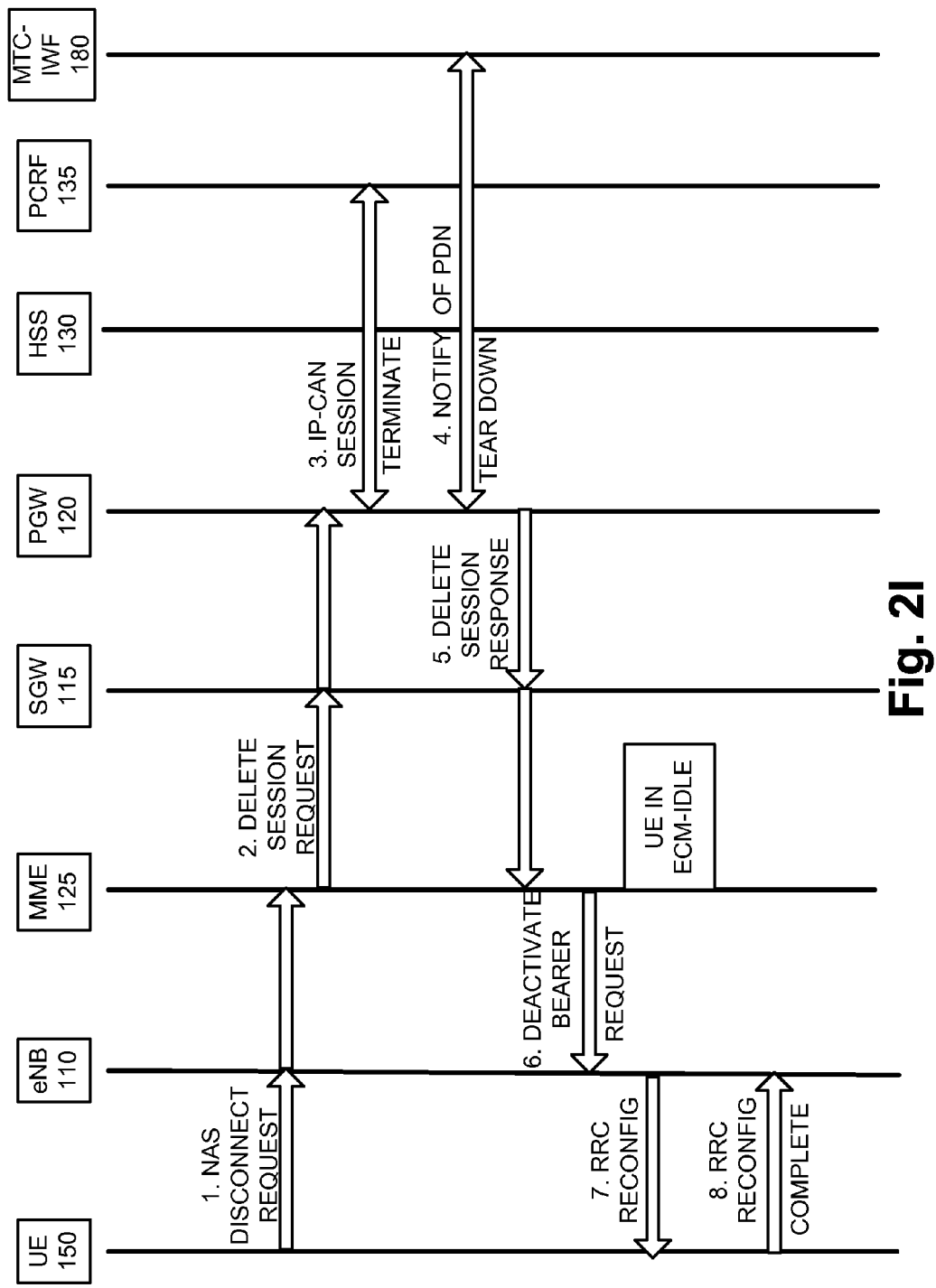

FIGS. 2G and 2H are diagrams illustrating an exemplary embodiment of an end device-side invocation of the data network connection control service to set up a data connection. Although FIGS. 2G and 2H illustrate UE 150, according to other embodiments, UE 150 may be substituted with end device 160. According to an exemplary scenario, assume that subsequent to attachment to LTE network 105, UE 150 determines to set up a PDN connection based on a triggering event. Referring to FIG. 2G, UE 150 transmits a message to MME 125 via eNB 110, as illustrated by message one (1) (NAS Service Request-Initiated). The message indicates to establish a default bearer between UE 150 and PGW 120. Additionally, the message may include parameters pertaining to the default bearer that is to be created. For example, the parameters may indicate a particular level of QoS (e.g., low, medium, high, etc.), bandwidth and/or bit rate, length of time (min., max.), allocation and retention priority (ARP), etc. MME 125 assigns an IP address to UE 150. Thereafter, the messaging, as illustrated by messages two (2) through fourteen (14) in FIGS. 2G and 2H, may proceed as conventionally performed to establish a PDN connection. However, as illustrated by message five (5) (Notify of PDN Setup), PGW 120 and MTC-IWF 180 communicate. For example, PGW 120 transmits a message to MTC-IWF 180 to inform MTC-IWF 180 that a PDN connection is being established. The message may also indicate the trigger identifier. Subsequent to establishment of the default bearer, UE 150 may transmit/receive data.

While FIGS. 2G and 2H illustrate exemplary messaging and describe exemplary processes that provide the data network connection control service, according to other embodiments, UE 150 and/or network elements of LTE network 105 (e.g., MME 125, etc.) may perform additional, different, and/or fewer processes to provide for the establishment of a PDN connection (e.g., a default bearer). For example, messages different from those explained above, may carry data pertaining to the data network connection control service, and consequently used to initiate the establishment of the default bearer. Alternatively, new or modified messages and/or new or modified interfaces associated with the network elements may be implemented to accomplish the same task as described.

FIGS. 2I and 2J are diagrams illustrating an exemplary embodiment of an end device-side invocation of the data network connection control service to tear down a data connection. Although FIGS. 2I and 2J illustrate UE 150, according to other embodiments, UE 150 may be substituted with end device 160. According to an exemplary scenario, assume that subsequent to a default bearer being established between UE 150 and PGW 120, UE 150 receives a trigger to tear down the PDN connection. Referring to FIG. 2I, UE 150 transmits a message (e.g., a PDN Disconnection Request) to MME 125 via eNB 110, illustrated as message one (1) (NAS Disconnect Request). The message indicates to release all EPS bearer contexts established toward this PDN connection, including the default bearer context. Additionally, in the message, UE 150 may set the value of Linked EPS Bearer Identity as the EPS Bearer Identify of the default bearer pertaining to the trigger identifier (e.g., the referent).

Thereafter, as illustrated in FIG. 2I, MME 125 initiates a teardown by transmitting a message to SGW 115, illustrated as message two (2) (Delete Session Request), which may include a Tunnel Endpoint Identifier (TEID). SGW 115 transmits the message (e.g., a Delete Session Request) to PGW 120. In response, PGW 120 invokes an IP-CAN Session Termination procedure to indicate that resources have been released. For example, PGW 120 transmits a message (e.g., an IP-CAN Session Termination) to PCRF 135, illustrated as message three (3) (IP-CAN Session Terminate). Additionally, PGW 120 transmits a notification to MTC-IWF 180 that indicates that the PDN connection is released, illustrated as message four (4) (Notify of PDN Tear Down). Additionally, the notification may include the IMSI of UE 150, the device trigger (e.g., the referent pertaining to message one (1)), etc. PGW 120 also transmits a message to SGW 115, which propagates to MME 125, illustrated as message five (5) (Delete Session Response).

As further illustrated in FIG. 2I, MME 125 transmits a message to eNB 110, illustrated as message six (6) (Deactivate Bearer Request), and MME 125 changes the ECM-context of UE 150 to an ECM IDLE state. In response to receiving message (6), eNB 110 invokes an RRC Connection procedure, in which messages seven (7) and eight (8) are exchanged between eNB 110 and UE 150, illustrated as message seven (7) (RRC Reconfig) and message eight (8) (RRC Reconfig Complete). Referring to FIG. 2J, the deactivation of the bearer is completed based on messages nine (9) (Deactivate Bearer Response), ten (10) (Direct Transfer), and eleven (11) (Deactivate EPS Bearer Context Accept).

While FIGS. 2I and 2J illustrate exemplary messaging and describe exemplary processes that provide the data network connection control service, according to other embodiments, UE 150 and/or network elements of LTE network 105 (e.g., MME 125, etc.) may perform additional, different, and/or fewer processes to provide for the tearing down of a PDN connection (e.g., a default bearer). For example, messages different from those explained above, may carry data pertaining to the data network connection control service, and consequently used to initiate the tear-down of the default bearer. Alternatively, new or modified messages and/or new or modified interfaces associated with the network elements may be implemented to accomplish the same task as described.

Figure 3:
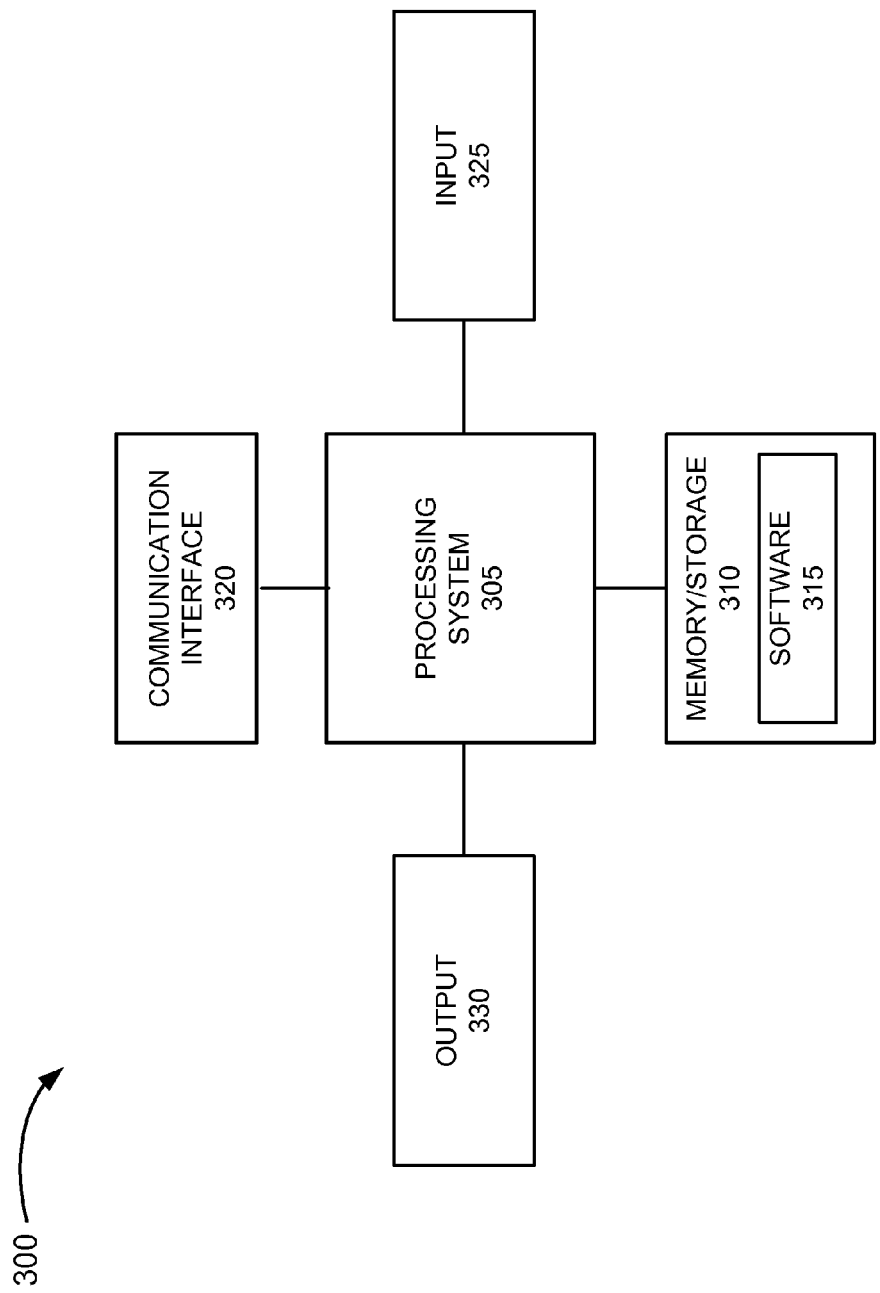
FIG. 3 is a diagram illustrating exemplary components of a device that may correspond to one or more of the devices illustrated in the exemplary environment of FIG. 1.

FIG. 3 is a diagram illustrating exemplary components of a device 300 that may correspond to one or more of the devices in environment 100. For example, device 300 may correspond to eNB 110, SGW 115, PGW 120, MME 125, HSS 130, UE 150, end device 160, MTC-IWF 180, as well as other devices illustrated and described. As illustrated in FIG. 3, according to an exemplary embodiment, device 300 includes a processor 305, memory/storage 310 that stores software 315, a communication interface 320, an input 325, and an output 330. According to other embodiments, device 300 may include fewer components, additional components, different components, and/or a different arrangement of components than those illustrated in FIG. 3 and described herein.

Processor 305 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 305 may be implemented as hardware (e.g., a microprocessor, etc.), a combination of hardware and software (e.g., a SoC, an ASIC, etc.), may include one or multiple memories (e.g., cache, etc.), etc.

Processor 305 may control the overall operation or a portion of operation(s) performed by device 300. Processor 305 may perform one or multiple operations based on an operating system and/or various applications or computer programs (e.g., software 315). Processor 305 may access instructions from memory/storage 310, from other components of device 300, and/or from a source external to device 300 (e.g., a network, another device, etc.).

Memory/storage 310 includes one or multiple memories and/or one or multiple other types of storage mediums. For example, memory/storage 310 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 310 may include a hard disk (e.g., a magnetic disk, an optical disk, a magneto-optic disk, a solid state disk, etc.) and a corresponding drive. Memory/storage 310 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 310 may include drives for reading from and writing to the storage medium.

Memory/storage 310 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 310 may store data, software, and/or instructions related to the operation of device 300.

Software 315 includes an application or a program that provides a function and/or a process. As an example, with reference to UE 150, end device 160, MME 125, PGW 120, MTC-IWF 180, server 175, etc., software 315 may include an application that, when executed by processor 305, provides the functions of the data network connection control service, as described herein. Software 315 is also intended to include firmware, middleware, microcode, hardware description language (HDL), and/or other form of instruction.

Communication interface 320 permits device 300 to communicate with other devices, networks, systems, and/or the like. Communication interface 320 includes one or multiple wireless interfaces and/or wired interfaces. For example, communication interface 320 may include one or multiple transmitters and receivers or transceivers. Communication interface 320 may operate according to a protocol stack and a communication standard.

Input 325 permits an input into device 300. For example, input 325 may include a keyboard, a mouse, a display, a touchscreen, a touchless screen, a button, a switch, an input port, speech recognition logic, and/or some other type of visual, auditory, tactile, etc., input component. Output 330 permits an output from device 300. For example, output 330 may include a speaker, a display, a touchscreen, a touchless screen, a light, an output port, and/or some other type of visual, auditory, tactile, etc., output component.

Device 300 may perform a process and/or a function, as described herein, in response to processor 305 executing software 315 stored by memory/storage 310. By way of example, instructions may be read into memory/storage 310 from another memory/storage 310 (not shown) or read from another device (not shown) via communication interface 320. The instructions stored by memory/storage 310 cause processor 305 to perform a process described herein. Alternatively, for example, according to other implementations, device 300 performs a process described herein based on the execution of hardware (processor 305, etc.).

Figure 4:
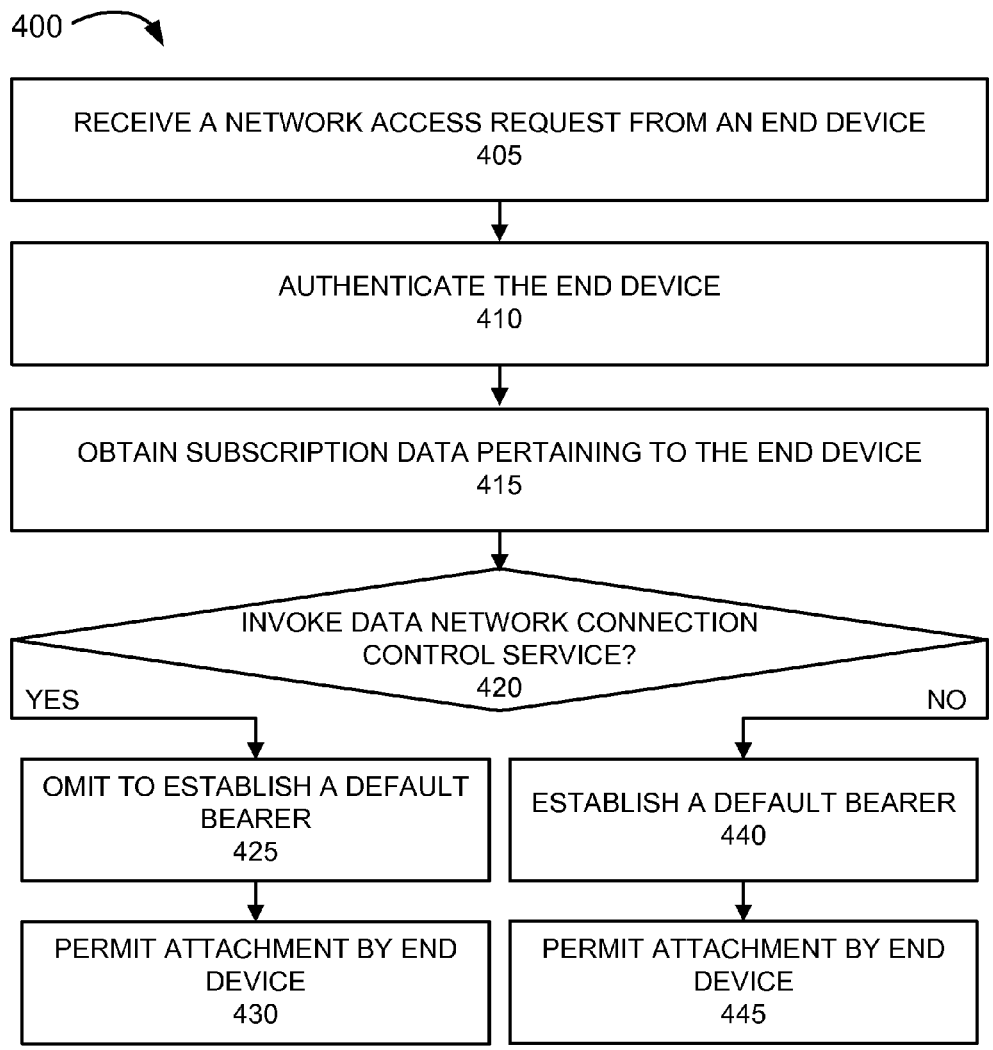
FIGS. 4-8 are flow diagrams that illustrate exemplary processes pertaining to the data network connection control service.

FIG. 4 is a flow diagram illustrating an exemplary process 400 pertaining to the data network connection control service. Process 400 is directed to a process previously described above with respect to FIGS. 2A and 2B, as well as elsewhere in this description, in which a user device attaches to a network without a default bearer being established. According to an exemplary embodiment, MME 125 performs steps of process 400. For example, processor 305 executes software 315 to perform the steps described. In process 400, the term "end device" is intended to be broadly interpreted to include various end devices, such as UE 150 and end device 160.

Referring to FIG. 4, block 405, process 400 begins with receiving a network access request from an end device. For example, MME 125 receives an Attach Request from UE 150 via eNB 110. According to an exemplary embodiment, the Attach Request includes a PDN Connectivity Request. According to another exemplary embodiment, the Attach Request does not include a PDN Connectivity Request.

In block 410, the end device is authenticated. For example, MME 125 receives an authentication message from the UE 150. MME 125 performs an authentication procedure with HSS 130 based on the authentication message. It may be assumed that UE 150 is successfully authenticated. In the event that UE 150 is not successfully authenticated, process 400 may end and network access may be denied.

In block 415, subscription data pertaining to the end device is obtained. For example, MME 125 receives subscription data pertaining to UE 150 from HSS 130. According to an exemplary embodiment, the subscription data indicates whether UE 150 is subscribed to the data network connection control service. Additionally, or alternatively, the subscription data indicates user preferences and/or default parameters pertaining to the data network connection control service.

In block 420, it is determined whether to invoke a data network connection control service. For example, MME 125 determines whether to invoke the data network connection control service, as described herein, based on the subscription data and/or the network access request.

When it is determined that the data network connection control service is to be invoked (block 420—YES), a default bearer is not established (block 425). For example, MME 125 omits to create, on behalf of UE 150, the default bearer between UE 150 and PGW 120. MME 125 also omits to assign an IP address to UE 150. Additionally, MME 125 creates an end device context that includes attachment with no default bearer being established.

In block 430, attachment of end device to a network is permitted. For example, MME accepts attachment, by UE 150, and provides for the attachment of UE 150 with eNB 110.

When it is determined that the data network connection control service is not to be invoked (block 420—NO), a default bearer is established (block 440). For example, MME 125 creates, on behalf of UE 150, the default bearer between UE 150 and PGW 120. Additionally, MME 125 creates an end device context that includes attachment with default bearer being established.

In block 445, attachment of end device to a network is permitted. For example, MME accepts attachment, by UE 150, and provides for the attachment of UE 150 with eNB 110.

Although FIG. 4 illustrates an exemplary process 400 of the data network connection control service, according to other embodiments, process 400 may include additional operations, fewer operations, and/or different operations than those illustrated in FIG. 4 and described.

Figure 5:
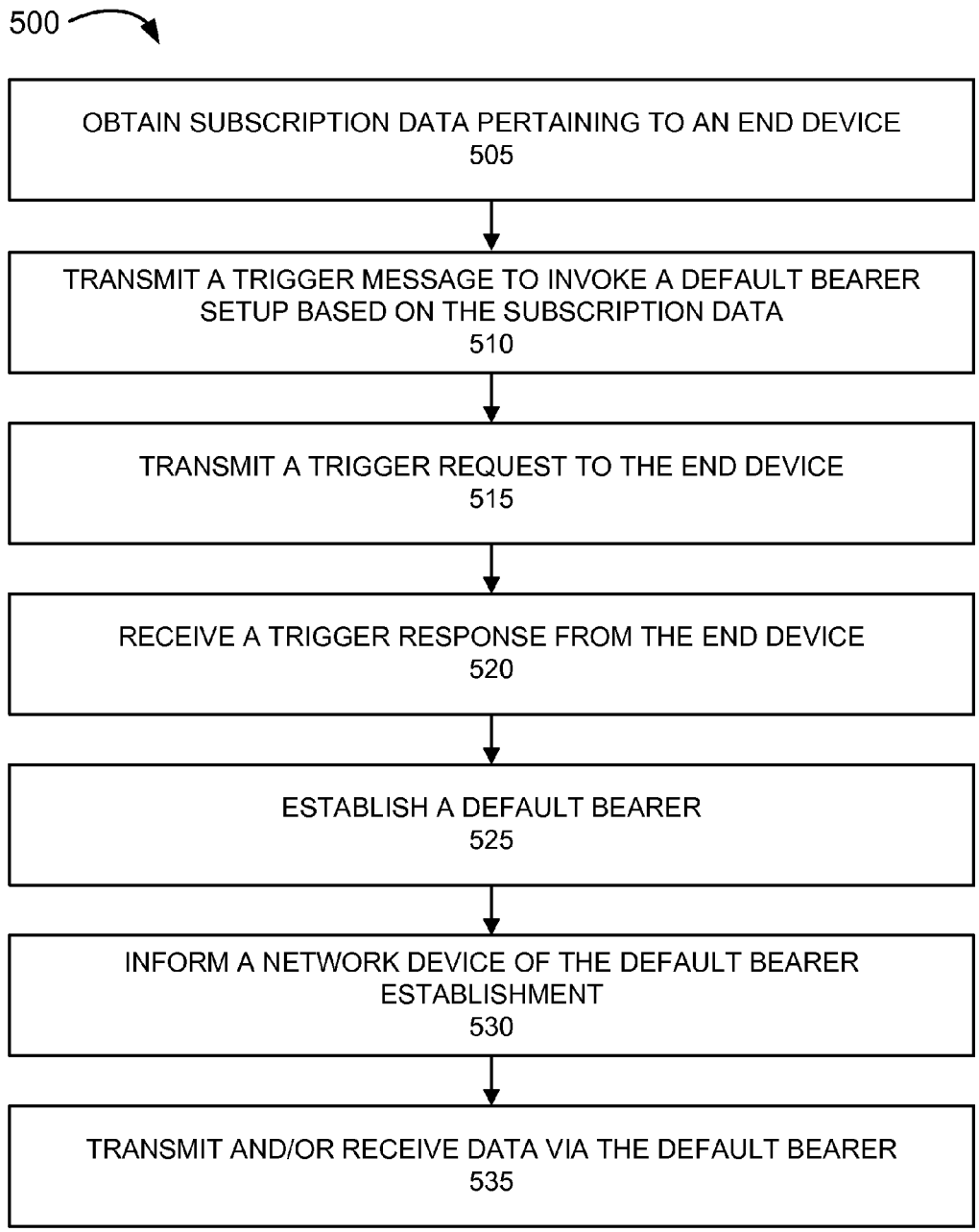

FIG. 5 is a flow diagram illustrating an exemplary process 500 pertaining to the data network connection control service. Process 500 is directed to a process previously described above with respect to FIGS. 2C and 2D, as well as elsewhere in this description, in which a network-side invocation to set up a data connection is provided. According to an exemplary embodiment, MME 125 performs steps of process 500. Additionally, according to an exemplary embodiment, MTC-IWF 180 performs steps of process 500. For example, processor 305 executes software 315 to perform the steps described. In process 500, the term "end device" is intended to be broadly interpreted to include various end devices, such as UE 150 and end device 160. Additionally, it may be assumed that the end device is attached to a network.

Referring to FIG. 5, in block 505, process 500 begins with obtaining subscription data. For example, MTC-IWF 180 queries HSS 130 to obtain subscription data pertaining to UE 150. The subscription data may include an identifier of UE 150 and a network address of a serving MME (e.g., MME 125). The subscription data may also include, for example, whether UE 150 subscribes to the data network connection control service, and if so, the connection state or context of UE 150. The subscription data may also include preferences of the data network connection control service pertaining to UE 150.

In block 510, a trigger message to invoke a default bearer setup is transmitted based on the subscription data. For example, MTC-IWF 180 transmits a trigger message to MME 125. The trigger message includes a request for UE 150 to establish a default bearer with PGW 120 and the identifier of UE 150. The trigger message may include other data, such as a referent pertaining to the request, the network address of MTC-IWF 180, the network address of server 175, and/or other data pertaining to the M2M application or service (e.g., type of data to be transmitted/received, etc.).

In block 515, a trigger request is transmitted to the end device. For example, MME 125 pages, via eNB 110, UE 150. A page message includes a request to UE 150 to establish a default bearer. The page message may also include the referent. In block 520, a trigger response is received from the end device. For example, MME 125 receives a message, via eNB 110, from UE 150. The message includes a request to establish a default bearer.

In block 525, a default bearer is established. For example, MME 125 creates, on behalf of UE 150, the default bearer between UE 150 and PGW 120. MME 125 assigns an IP address to UE 150. Additionally, MME 125 creates an end device context that includes attachment with default bearer being established.

In block 530, a network device is informed of the default bearer establishment. For example, PGW 120 transmits a message to MTC-IWF 180 and/or server 175 that indicates a creation of the default bearer. The message may also include the trigger referent.

In block 535, data is transmitted and/or received between the end device and a server device. For example, UE 150 and/or server 175 transmits/receives data.

Although FIG. 5 illustrates an exemplary process 500 of the data network connection control service, according to other embodiments, process 500 may include additional operations, fewer operations, and/or different operations than those illustrated in FIG. 5 and described.

Figure 6:
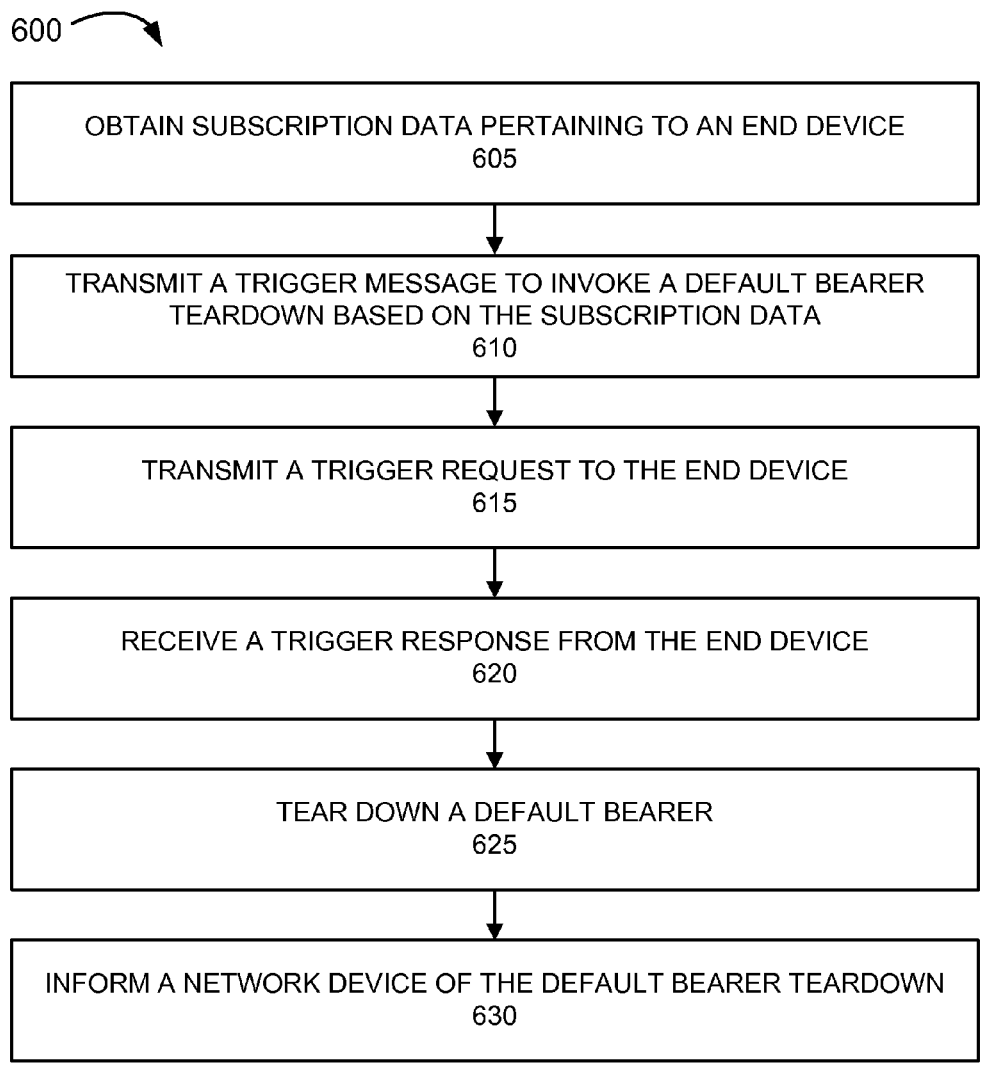

FIG. 6 is a flow diagram illustrating an exemplary process 600 pertaining to the data network connection control service. Process 600 is directed to a process previously described above with respect to FIGS. 2E and 2F, as well as elsewhere in this description, in which a network-side invocation to tear down a data connection is provided. According to an exemplary embodiment, MME 125 performs steps of process 600. Additionally, according to an exemplary embodiment, MTC-IWF 180 performs steps of process 600. For example, processor 305 executes software 315 to perform the steps described. In process 600, the term "end device" is intended to be broadly interpreted to include various end devices, such as UE 150 and end device 160. Additionally, it may be assumed that the end device is attached to a network and a default bearer exists. According to this example, assume that MTC-IWF 180 and/or server 175 stores information pertaining to default bearer set ups and tear downs. Also, according to this example, assume that the end device is a mobile device.

Referring to FIG. 6, in block 605, process 600 begins with obtaining subscription data. For example, MTC-IWF 180 queries HSS 130 to obtain subscription data pertaining to UE 150. The subscription data includes a network address of a serving MME (e.g., MME 125). The subscription data also includes a connection state or context of UE 150.

In block 610, a trigger message to invoke a default bearer teardown is transmitted based on the subscription data. For example, MTC-IWF 180 transmits a trigger message to MME 125. The trigger message includes a request for UE 150 to tear down a default bearer with PGW 120 and the identifier of UE 150. The trigger message may include other data, such as a referent pertaining to the request, the network address of MTC-IWF 180, the network address of server 175, and/or other data pertaining to the M2M application or service (e.g., type of data to be transmitted/received, etc.).

In block 615, a trigger request is transmitted to the end device. For example, MME 125 transmits an SMS message, via eNB 110, to UE 150. The SMS message includes a request to UE 150 to tear down a default bearer. The SMS message may also include the referent.

In block 620, a trigger response is received from the end device. For example, MME 125 receives a message, via eNB 110, from UE 150. The message includes a request to disconnect from a default bearer. The message may also include an identifier of the default bearer to which the disconnection request pertains.

In block 625, a default bearer is torn down. For example, MME 125 initiates, on behalf of UE 150, a tear down of the default bearer between UE 150 and PGW 120. Additionally, MME 125 creates an end device context that includes attachment without default bearer.

In block 630, a network device is informed of the default bearer establishment. For example, PGW 120 transmits a message to MTC-IWF 180 and/or server 175 that indicates a tear down of the default bearer. The message may also include the trigger referent.

Although FIG. 6 illustrates an exemplary process 600 of the data network connection control service, according to other embodiments, process 600 may include additional operations, fewer operations, and/or different operations than those illustrated in FIG. 6 and described.

Figure 7:
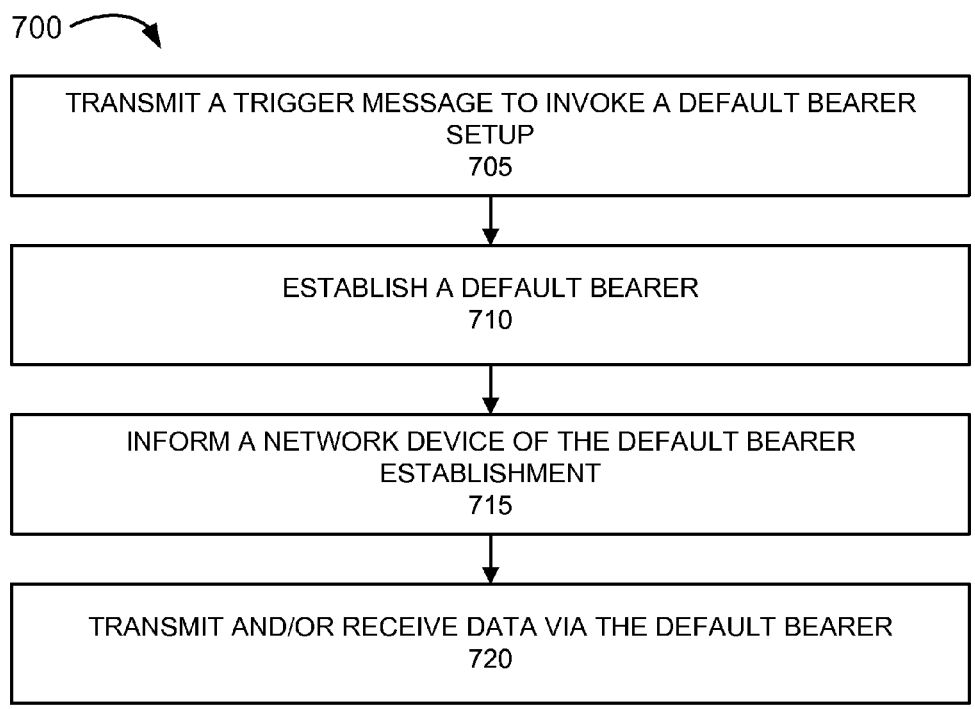

FIG. 7 is a flow diagram illustrating an exemplary process 700 pertaining to the data network connection control service. Process 700 is directed to a process previously described above with respect to FIGS. 2G and 2H, as well as elsewhere in this description, in which an end device-side invocation to set up a data connection is provided. According to an exemplary embodiment, MME 125 performs steps of process 700. Additionally, according to an exemplary embodiment, the end device (e.g., UE 150 or end device 160) performs steps of process 700. It may be assumed that the end device is attached to a network without a default bearer. Additionally, similar to that previously described in relation to FIG. 5, it may be assumed that the end device obtains a trigger to establish a default bearer. For example, various trigger mechanisms may be implemented depending on the M2M service or other type of application that may provide the trigger mechanism.

Referring to FIG. 7, in block 705, a trigger message to invoke a default bearer setup is transmitted. For example, UE 150 transmits a trigger message to MME 125. The trigger message includes a request for MME 125 to establish a default bearer and the identifier of UE 150. The trigger message may include other data, such as a referent pertaining to the request, the network address of MTC-IWF 180, the network address of server 175, and/or other data pertaining to the M2M application or service (e.g., type of data to be transmitted/received, etc.).

In block 710, a default bearer is established. For example, MME 125 creates, on behalf of UE 150, the default bearer between UE 150 and PGW 120. Also, MME 125 assigns an IP address to UE 150. Additionally, MME 125 creates an end device context that includes attachment with default bearer being established.

In block 715, a network device is informed of the default bearer establishment. For example, PGW 120 transmits a message to MTC-IWF 180 and/or server 175 that indicates a creation of the default bearer.

In block 720, data is transmitted and/or received. For example, UE 150 transmits and/or receives data using the default bearer.

Although FIG. 7 illustrates an exemplary process 700 of the data network connection control service, according to other embodiments, process 700 may include additional operations, fewer operations, and/or different operations than those illustrated in FIG. 7 and described.

Figure 8:
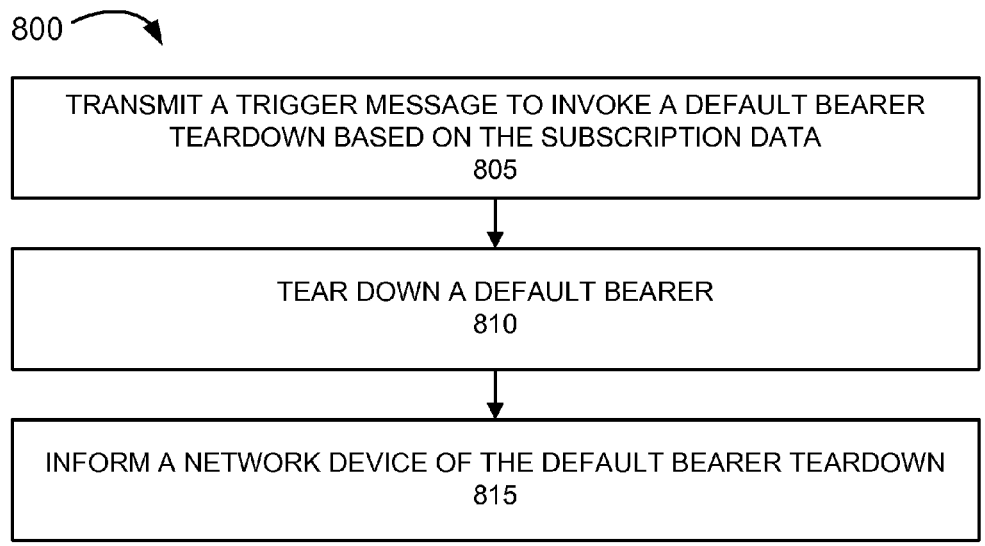

FIG. 8 is a flow diagram illustrating an exemplary process 800 pertaining to the data network connection control service. Process 800 is directed to a process previously described above with respect to FIGS. 2I and 2J, as well as elsewhere in this description, in which an end device invocation to tear down a data connection is provided. According to an exemplary embodiment, MME 125 performs steps of process 800. Additionally, according to an exemplary embodiment, the end device (e.g., UE 150 or end device 160) performs steps of process 800. It may be assumed that the end device is attached to a network with a default bearer. Additionally, similar to that previously described in relation to FIG. 6, it may be assumed that the end device obtains a trigger to tear down establish a default bearer. For example, various trigger mechanisms may be implemented depending on the M2M service or other type of application that may provide the trigger mechanism.

Referring to FIG. 8, in block 805, a trigger message to invoke a default bearer teardown is transmitted. For example, UE 150 transmits a trigger message to MME 125. The trigger message includes a request for MME 125 to tear down a default bearer with PGW 120 and the identifier of UE 150. The trigger message may include other data, such as a referent pertaining to the request, the network address of MTC-IWF 180, the network address of server 175, and/or other data pertaining to the M2M application or service (e.g., type of data to be transmitted/received, etc.).

In block 810, a default bearer is torn down. For example, MME 125 initiates, on behalf of UE 150, a tear down of the default bearer between UE 150 and PGW 120. Additionally, MME 125 creates an end device context that includes attachment without default bearer.

In block 815, a network device is informed of the default bearer teardown. For example, PGW 120 transmits a message to MTC-IWF 180 and/or server 175 that indicates a tear down of the default bearer.

Although FIG. 8 illustrates an exemplary process 800 of the data network connection control service, according to other embodiments, process 800 may include additional operations, fewer operations, and/or different operations than those illustrated in FIG. 8 and described.

The foregoing description of embodiments provides illustration, but is not intended to be exhaustive or to limit the embodiments to the precise form disclosed. Accordingly, modifications to the embodiments described herein may be possible. For example, although environment 100 includes LTE network 105, according to other embodiments, environment 100 may not include LTE network 105. For example, a network, other than an LTE network, may include nodes that are similar (e.g., in terms of function) as MME 125, HSS 130, PGW 120, etc. of LTE network 105, and within such a network, a default bearer is established during an attachment procedure between an end device and the network. In this regard, a data network connection control service may be implemented in such a network.

Additionally, or alternatively, a network device described in LTE network 105 may be implemented by nodes that are similar (e.g., in terms of function). By way of example, HSS 130 may be implemented as a Home Location Register (HLR), a Subscriber Profile Repository (SPR), or a User Profile Server Function (USPF). Additionally, or alternatively, as previously explained, although LTE network 105 includes eNB 110, a variety of other wireless access networks that include other types of nodes, may be implemented.

Additionally, or alternatively, although environment 100 includes LTE network 105, according to other embodiments, LTE network 105 may be implemented as an LTE Advanced network or a future generation wireless network architecture.

Additionally, or alternatively, external network 170 has been described to include MTC-IWF 180 and servers 175, according to other embodiments, other types of nodes may be implemented. For example, instead of MTC-IWF 180, a gateway device or other type of intermediary device may be implemented. Additionally, although network-side invocations have been described in relation to server 175, according to other embodiments, other nodes or network elements may invoke the data network connection control service. Additionally, or alternatively, although communications, when a default bearer is established, may involve UE 150 and server 175, according to other embodiments, when a default bearer is established, communications may involve UE 150 and any other type of communication device (e.g., another UE 150, end device 160, a database management system (DBS), a controller device, etc.).

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 4-8, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 305, etc.), or a combination of hardware and software (e.g., software 315). The embodiments have been described without reference to the specific software code since the software code can be designed to implement the embodiments based on the description herein and commercially available software design environments/languages.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The word "exemplary" is used herein to mean "serving as an example." Any embodiment or implementation described as "exemplary" is not necessarily to be construed as preferred or advantageous over other embodiments or implementations.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 305) of a computational device. A non-transitory storage medium includes one or more of the storage mediums described in relation to memory/storage 310.

No element, act, or instruction described in the present application should be construed as critical or essential to the embodiments described herein unless explicitly described as such.

What is claimed is:

1. A method comprising:
   receiving, by a network device, a request from an end device to access a network;
   obtaining, by the network device, subscription data pertaining to the end device based on the request, wherein the subscription data indicates that a user associated with the end device or the end device is subscribed to a service that permits attaching to the network without establishing a default bearer, and includes preference data pertaining to the service, wherein the preference data indicates a periodicity for establishment and teardown of the default bearer and the request includes data that indicates whether to invoke the service;
   determining, by the network device, whether to establish the default bearer during an attachment procedure based on the request and the subscription data;
   permitting, by the network device, attachment to the network without establishment of the default bearer based on determining not to establish the default bearer; and
   storing, by the network device, context data that indicates the end device is attached to the network without the default bearer based on the permitting.

2. The method of claim 1, wherein the network device includes a Mobility Management Entity (MME), the network includes a Long Term Evolution network, and the default bearer includes a data connection between the end device and a packet data network gateway (PGW).

3. The method of claim 1, further comprising:
   receiving, by the network device, subsequent to the attachment of the end device to the network, a request to set up the default bearer;
   setting up the default bearer based on the request to set up the default bearer; and
   storing context data that indicates the end device is attached with the default bearer based on the setting up.

4. The method of claim 3, further comprising:
receiving, by the network device, subsequent to the establishment of the default bearer, a request to tear down the default bearer;
tearing down the default bearer based on the request to tear down the default bearer, and wherein the end device remains attached to the network subsequent to the tearing down of the default bearer; and
storing context data that indicates the end device is attached without the default bearer based on the tearing down.

5. The method of claim 3, further comprising:
informing a Machine-Type Communications-Interworking Function (MTC-IWF) of the setting up of the default bearer.

6. The method of claim 1, further comprising:
receiving, by the network device, subsequent to the attachment of the end device to the network, a request to set up the default bearer, from a gateway device, wherein the request from the gateway device is initiated without receiving a request to set up the default bearer from the end device;
setting up the default bearer based on the request to set up the default bearer received from the gateway device; and
storing context data that indicates the end device is attached to the network with the default bearer based on the setting up.

7. The method of claim 6, further comprising:
receiving, by the network device, subsequent to the establishment of the default bearer, a request to tear down the default bearer, from the gateway device, wherein the request from the gateway device to tear down the default bearer is initiated without receiving a request to tear down the default bearer from the end device;
tearing down the default bearer based on the request to tear down the default bearer received from the gateway device, and wherein the end device remains attached to the network subsequent to the tearing down of the default bearer; and
storing context data that indicates the end device is attached to the network without the default bearer based on the tearing down.

8. The method of claim 1, wherein the preference data indicates a maximum session timer during which the default bearer is maintained.

9. A network device comprising:
a communication interface;
a memory, wherein the memory stores instructions; and
a processor, wherein the processor executes the instructions to:
receive, via the communication interface, a request from an end device to access a network;
obtain, via the communication interface, subscription data pertaining to the end device based on the request, wherein the subscription data indicates that a user associated with the end device or the end device is subscribed to a service that permits attachment to the network without establishment of a default bearer, and includes preference data pertaining to the service, wherein the preference data indicates a periodicity for establishment and teardown of the default bearer and the request includes data that indicates whether to invoke the service;
determine whether to establish the default bearer during an attachment procedure based on the request and the subscription data;
permit attachment to the network without establishment of the default bearer based on a determination not to establish the default bearer; and
store context data that indicates the end device is attached to the network without the default bearer.

10. The network device of claim 9, wherein the network device includes a Mobility Management Entity (MME), and the network includes a Long Term Evolution network.

11. The network device of claim 9, wherein the processor further executes the instructions to:
receive, via the communication interface, subsequent to the attachment of the end device to the network, a request to set up the default bearer;
transmit, via the communication interface, a message to initiate the setting up of the default bearer based on the request to set up the default bearer;
receive, via the communication interface, another message that indicates the default bearer is set up; and
store context data that indicates the end device is attached to the network with the default bearer based on the receipt of the other message.

12. The network device of claim 11, wherein the processor further executes the instructions to:
receive, via the communication interface, subsequent to the establishment of the default bearer, a request to tear down the default bearer;
transmit, via the communication interface, a message to initiate the tearing down of the default bearer based on the request to tear down the default bearer;
receive, via the communication interface, a message that indicates the default bearer is torn down; and
store context data that indicates the end device is attached to the network without the default bearer based on the receipt of the message that indicates the default bearer is torn down.

13. The network device of claim 9, wherein the processor further executes the instructions to:
receive, via the communication interface, subsequent to the attachment of the end device to the network, a request to set up the default bearer, from another network device, wherein the request from the other network device is initiated without receiving a request to set up the default bearer from the end device;
transmit, via the communication interface, a message to initiate the setting up of the default bearer based on the request to set up the default bearer received from the other network device;
receive, via the communication interface, another message that indicates the default bearer is set up; and
store context data that indicates the end device is attached to the network with the default bearer based on the receipt of the other message.

14. The network device of claim 13, wherein the processor further executes the instructions to:
receive, via the communication interface, subsequent to the establishment of the default bearer, a request to tear down the default bearer, from the other network device, wherein the request from the other network device to tear down the default bearer is initiated without receiving a request to tear down the default bearer from the end device;
transmit, via the communication interface, a message to initiate the tearing down of the default bearer based on the request to tear down the default bearer received from the other network device;
receive, via the communication interface, a message that indicates the default bearer is torn down; and store context data that indicates the end device is attached to the network without the default bearer based on the receipt of the message that indicates the default bearer is torn down.

15. The network device of claim 9, wherein the processor further executes the instructions to:
establish, via the communication interface, during the attachment procedure, a signaling connection with the end device; and
maintain, via the communication interface, subsequent to the attachment of the end device to the network, the signaling connection with the end device.

16. A non-transitory, computer-readable storage medium storing instructions executable by a processor of a computational device, which when executed cause the computational device to:
receive a request from an end device to access a network;
obtain subscription data pertaining to the end device based on the request, wherein the subscription data indicates that a user associated with the end device or the end device is subscribed to a service that permits attachment to the network without establishment of a default bearer, and includes preference data pertaining to the service, wherein the preference data indicates a periodicity for establishment and teardown of the default bearer and the request includes data that indicates whether to invoke the service;
determine whether to establish a default bearer during an attachment procedure based on at least one of the request or the subscription data;
permit attachment to the network without establishment of the default bearer based on a determination not to establish the default bearer; and
store context data that indicates the end device is attached to the network without the default bearer based on the permission.

17. The non-transitory, computer-readable storage medium of claim 16, further storing instructions executable by the processor of the computational device, which when executed cause the computational device to:
receive, subsequent to the attachment of the end device to the network, a request to set up the default bearer;
transmit a message to initiate the setting up of the default bearer based on the request to set up the default bearer;
receive another message that indicates the default bearer is set up; and
store context data that indicates the end device is attached to the network with the default bearer based on the receipt of the other message.

18. The non-transitory, computer-readable storage medium of claim 17, further storing instructions executable by the processor of the computational device, which when executed cause the computational device to:
receive subsequent to the establishment of the default bearer, a request to tear down the default bearer;
transmit a message to initiate the tearing down of the default bearer based on the request to tear down the default bearer;
receive a message that indicates the default bearer is torn down; and
store context data that indicates the end device is attached to the network without the default bearer based on the receipt of the message that indicates the default bearer is torn down.

19. The non-transitory, computer-readable storage medium of claim 16, further storing instructions executable by the processor of the computational device, which when executed cause the computational device to:
receive subsequent to the attachment of the end device to the network, a request to set up a default bearer, from a network device, wherein the network device includes one of a Machine-Type Communications-Interworking Function (MTC-IWF), an application server device, or a gateway device, and wherein the request from the network device is initiated without receiving a request to set up the default bearer from the end device;
transmit a message to initiate the setting up of the default bearer based on the request to set up the default bearer received from the network device;
receive another message that indicates the default bearer is set up; and
store context data that indicates the end device is attached to the network with the default bearer based on the receipt of the other message.

20. The non-transitory, computer-readable storage medium of claim 19, further storing instructions executable by the processor of the computational device, which when executed cause the computational device to:
receive, subsequent to the establishment of the default bearer, a request to tear down the default bearer, from the network device, wherein the request from the network device to tear down the default bearer is initiated without receiving a request to tear down the default bearer from the end device;
transmit a message to initiate the tearing down of the default bearer based on the request to tear down the default bearer received from the network device;
receive a message that indicates the default bearer is torn down; and
store context data that indicates the end device is attached to the network without the default bearer based on the receipt of the message that the default bearer is torn down.

* * * * *